US007010483B2

(12) United States Patent
Rajan

(10) Patent No.: US 7,010,483 B2
(45) Date of Patent: Mar. 7, 2006

(54) SPEECH PROCESSING SYSTEM

(75) Inventor: Jebu Jacob Rajan, Bracknell (GB)

(73) Assignee: Canon Kabushiki Kaisha, Tokyo (JP)

( * ) Notice: Subject to any disclaimer, the term of this patent is extended or adjusted under 35 U.S.C. 154(b) by 719 days.

(21) Appl. No.: 09/866,854

(22) Filed: May 30, 2001

(65) Prior Publication Data

US 2002/0026309 A1 Feb. 28, 2002

(30) Foreign Application Priority Data

Jun. 2, 2000 (GB) .................................... 0013541
Aug. 17, 2000 (GB) .................................... 0020314

(51) Int. Cl.
*G10L 15/20* (2006.01)
*G10L 21/02* (2006.01)

(52) U.S. Cl. ....................... 704/228; 704/233; 704/240

(58) Field of Classification Search ................ 704/226, 704/227, 228, 233, 234, 240; 714/746
See application file for complete search history.

(56) References Cited

U.S. PATENT DOCUMENTS

| | | | | |
|---|---|---|---|---|
| 4,386,237 A | | 5/1983 | Virupaksha et al. | |
| 4,811,399 A | | 3/1989 | Landell et al. | |
| 4,860,360 A | | 8/1989 | Boggs | |
| 4,905,286 A | | 2/1990 | Sedgwick et al. | |
| 5,012,518 A | | 4/1991 | Liu et al. | |
| 5,315,538 A | | 5/1994 | Borrell et al. | |
| 5,325,397 A | * | 6/1994 | Scholz et al. | 375/224 |
| 5,432,859 A | | 7/1995 | Yang et al. | |
| 5,432,884 A | | 7/1995 | Kapanen et al. | |
| 5,507,037 A | | 4/1996 | Bartkowiak et al. | |
| 5,611,019 A | | 3/1997 | Nakatoh et al. | |
| 5,742,694 A | | 4/1998 | Eatwell | |
| 5,784,297 A | | 7/1998 | O'Brien, Jr. et al. | |
| 5,799,276 A | | 8/1998 | Komissarchik et al. | 704/251 |

(Continued)

FOREIGN PATENT DOCUMENTS

EP 0 554 083 A2 8/1993

(Continued)

OTHER PUBLICATIONS

Quatieri et al., "Magnitude-only estimation of handset nonlinearity with application to speaker recognition," Proceedings of the 1998 IEEE International Conference on Acoustics, Speech, and Signal Processing, May 12-15, 1998, vol. 2, pp. 745 to 748.*

(Continued)

*Primary Examiner*—Martin Lerner
(74) *Attorney, Agent, or Firm*—Fitzpatrick Cella Harper & Scinto

(57) ABSTRACT

A speech processing system is provided which is operable to receive sets of signal values representative of a speech signal generated by a speech source. The system is operable to determine a measure of the quality of the speech signal by performing a statistical analysis of the received sets of signal values. The system stores data defining a predetermined function derived from a signal model which models the speech source and which defines a probability density function which gives, for a given set of model parameters, the probability that the signal model has those model parameters given that the signal model is assumed to have generated the received set of signal values. The system applies a current set of received signal values to the stored probability density function and then draws samples from it using a Gibbs sampler. The system then analyses the samples to determine a measure of the variance of some of the samples and then outputs a signal indicative of the quality of the received speech signal values in dependence upon the determined variance.

65 Claims, 15 Drawing Sheets

U.S. PATENT DOCUMENTS

| | | | | |
|---|---|---|---|---|
| 5,873,076 | A * | 2/1999 | Barr et al. | 707/3 |
| 5,884,255 | A | 3/1999 | Cox | 704/233 |
| 5,884,269 | A * | 3/1999 | Cellier et al. | 704/501 |
| 5,963,901 | A | 10/1999 | Vähätalo | |
| 6,018,317 | A | 1/2000 | Dogan et al. | |
| 6,044,336 | A | 3/2000 | Marmarelis et al. | |
| 6,134,518 | A | 10/2000 | Cohen et al. | 704/201 |
| 6,157,909 | A | 12/2000 | Mauuary et al. | |
| 6,215,831 | B1 * | 4/2001 | Nowack et al. | 375/340 |
| 6,226,613 | B1 | 5/2001 | Turin | 704/256 |
| 6,266,633 | B1 | 7/2001 | Higgins et al. | |
| 6,324,502 | B1 | 11/2001 | Handel et al. | |
| 6,374,221 | B1 | 4/2002 | Haimi-Cohen | |
| 6,377,919 | B1 | 4/2002 | Burnett et al. | 704/231 |
| 6,397,181 | B1 * | 5/2002 | Li et al. | 704/256.4 |
| 6,438,513 | B1 | 8/2002 | Pastor et al. | |
| 6,516,090 | B1 | 2/2003 | Lennon et al. | |
| 6,546,515 | B1 * | 4/2003 | Vary et al. | 714/746 |
| 6,549,854 | B1 | 4/2003 | Malinverno et al. | |
| 6,708,146 | B1 | 3/2004 | Sewall et al. | 704/217 |
| 6,760,699 | B1 * | 7/2004 | Weerackody et al. | 704/233 |
| 6,879,952 | B1 * | 4/2005 | Acero et al. | 704/222 |

FOREIGN PATENT DOCUMENTS

| | | | |
|---|---|---|---|
| EP | 0 631 402 | A2 | 12/1994 |
| EP | 0 674 306 | A2 | 9/1995 |
| EP | 0 952 589 | A2 | 10/1999 |
| EP | 0 996 112 | A2 | 4/2000 |
| EP | 1 022 583 | A2 | 7/2000 |
| EP | 1 160 768 | A2 | 12/2001 |
| EP | 1 034 441 | B1 | 4/2003 |
| GB | 2 137 052 | | 9/1984 |
| GB | 2 332 054 | A | 6/1999 |
| GB | 2 332 055 | A | 6/1999 |
| GB | 2 345 967 | A | 7/2000 |
| GB | 2 349 717 | A | 11/2000 |
| GB | 2 356 106 | A | 5/2001 |
| GB | 2 356 107 | A | 5/2001 |
| GB | 2 356 313 | A | 5/2001 |
| GB | 2 356 314 | A | 5/2001 |
| GB | 2 360 670 | A | 9/2001 |
| GB | 2 361 339 | | 10/2001 |
| GB | 2 363 557 | A | 12/2001 |
| JP | 2001-44926 | | 2/2001 |
| WO | WO 92/22891 | | 12/1992 |
| WO | WO 98/38631 | | 9/1998 |
| WO | WO 99/28760 | | 6/1999 |
| WO | WO 99/28761 | | 6/1999 |
| WO | WO 99/64887 | | 12/1999 |
| WO | WO 00/11650 | | 3/2000 |
| WO | WO 00/38179 | | 6/2000 |
| WO | WO 00/45375 | | 8/2000 |
| WO | WO 00/54168 | | 9/2000 |

OTHER PUBLICATIONS

Numerical Recipes in C by W. Press, et al., Chapter 7, Cambridge University Press (1992).

"Reversible jump Markov chain Monte Carlo Computation and Bayesian model determination" by Peter Green, Biometrika, vol. 82, pp. 711-732 (1995).

"The Simulation Smoother For Time Series Models", Biometrika, vol. 82, 2, pp. 339-350 (1995).

"Probabilistic inference using Markov chain Monte Carlo methods" by R. Neal. Technical Report CRG-TR-93-1, Department of Computer Science, University of Toronto (1993).

"Fundamentals of Speech Recognition," Rabiner, et al., Prentice Hall, Englewood Cliffs, New Jersey, pp. 115 and 116, 1993.

"Bayesian Separation and Recovery of Convolutively Mixed Autoregssive Sources", Godsill, et al., ICASSP, Mar. 1999.

"Statistical Properties of STFT Ratios for Two Channel Systems and Application to Blind Source Separation", Balan, et al., Siemens Corporate Research, Princeton, N, pp. 429-434.

Bayesian Approach to Parameter Estimation and Interpolation of Time-Varying Autoregressive Interpolation of Time-Varying Autoregressive Processes Using the Gibbs Sampler, Rajan, et al., IEE Proc.-Vis. Image Signal Process., vol. 44, No. 4, Aug. 1997, pp. 249-256.

"An Introduction to the Kalman Filter", Welch, et al., Dept. of Computer Science, University of North Carolina at Chapel Hill, NC, Sep. 1997.

"Query Expansion for Imperfect Speech: Appliations In Distributed Learning", Srinivasan, et al., Proc. IEEE Workshop on Content-based Access of Image and Video Libraries, 2000, pp. 50-54.

Couvreur, et al., "Wavelet-based Non-Parametric HMM's: Theory and Applications," Proc. International Conference Acoustics, Speech and Signal Processing, Istanbul, vol. 1, Jun. 5-9, 2000, pp. 604-607.

Hopgood, et al., "Bayesian Single Channel Blind Deconvolution Using Parametric Signal and Channel Models," Proc. IEEE Workshop on Applications of Signal Processing to Audio and Acoustics, New Paltz, NY, Oct. 17-20, 1999, pp. 151-154.

Andrieu, et al., "Bayesian Blind Marginal Separation of Convolutively Mixed Discrete Sources," IEEE Proc., 1998, pp. 43-52.

* cited by examiner

SPEECH PROCESSING SYSTEM

The present invention relates to an apparatus for and method of determining a quality measure indicative of the quality of an audio signal. The invention particularly relates to a statistical processing of an input speech signal to derive this quality measure.

Being able to provide a measure of the quality of an input speech signal is beneficial in a number of systems. For example, it can be used to control the way in which data files may be retrieved from a database or the way in which the speech signal may be encoded for onward transmission. The speech quality measure may also be used to control the recognition processing operation in, example, a speech recognition system.

The prior art techniques for determining a quality measure of a speech signal rely on comparing the speech signal with a "clean" reference signal. These techniques are also done off-line and are not suited to real-time speech quality determination.

One aim of the present invention is to provide an alternative technique for determining a measure of the quality of an input speech signal. In one embodiment, the determined quality measure is indicative of the signal to noise ratio for the input speech signal.

According to one aspect, the present invention provides an apparatus for determining a quality measure indicative of the quality of an audio signal, the apparatus comprising: a memory for storing a predetermined function which gives a probability density for parameters of a predetermined audio model which is assumed to have generated a set of received audio signal values; means for receiving a set of audio signal values representative of an input audio signal; means for applying a set of received audio signal values to the stored function to give the probability density for the model parameters; means for processing the function with said set of received audio signal values applied to derive samples of parameter values from said probability density; and means for analysing at least some of said derived samples of parameter values to determine a signal indicative of the quality of the received audio signal values.

In one embodiment the audio model comprises an auto-regressive (AR) part which models speech and a moving average (MA) part which models the channel between the speech source and the receiver; and wherein the speech quality measure is derived from parameters of at least one of those parts. For example, the speech quality measure may be derived from the AR parameter values or from the MA parameter values. Alternatively, it may be determined from the variance of some of these parameter values.

Exemplary embodiments of the present invention will now be described with reference to the accompanying drawings in which.

Figure 2:
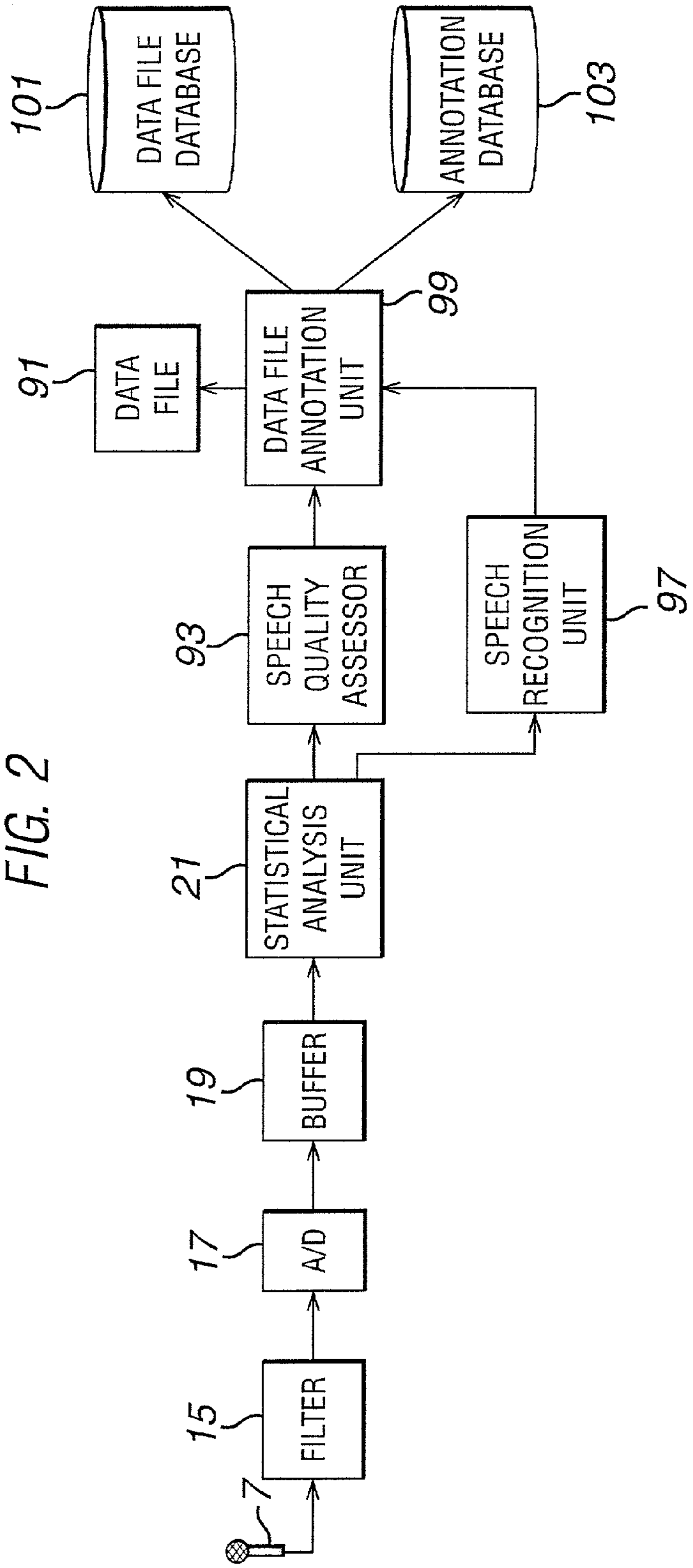
FIG. 2 is block diagram illustrating the principal components of a data file annotation system.
Figure 6:
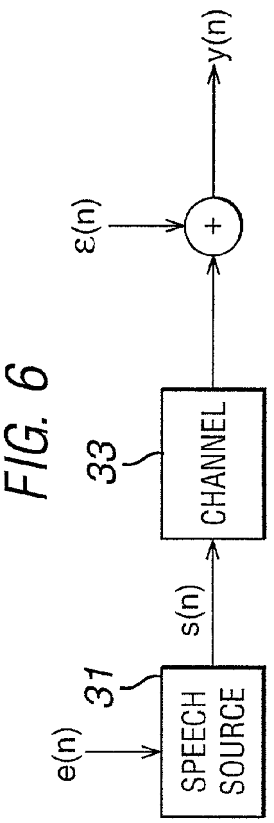
Figure 4:
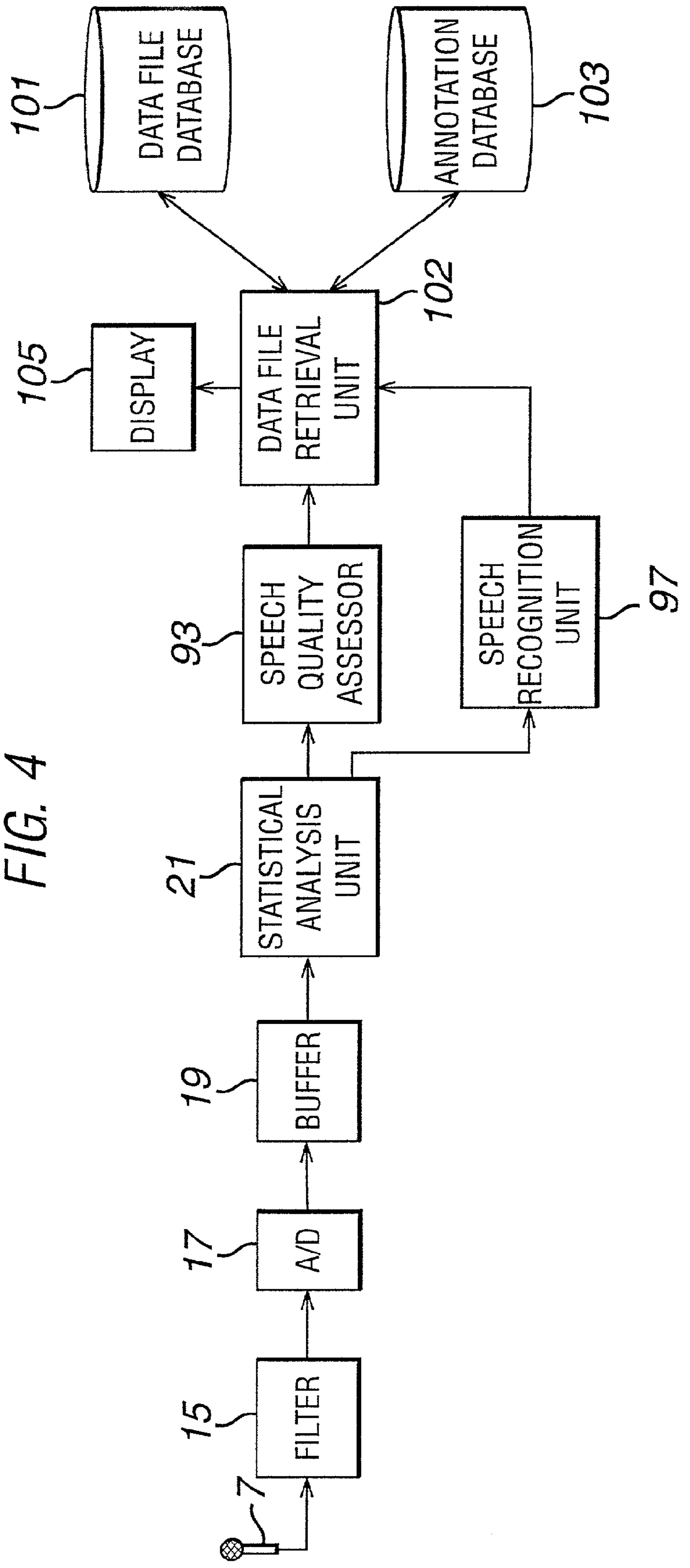
FIG. 4 is block diagram illustrating the principal components of a data file retrieval system.
Figure 5A:
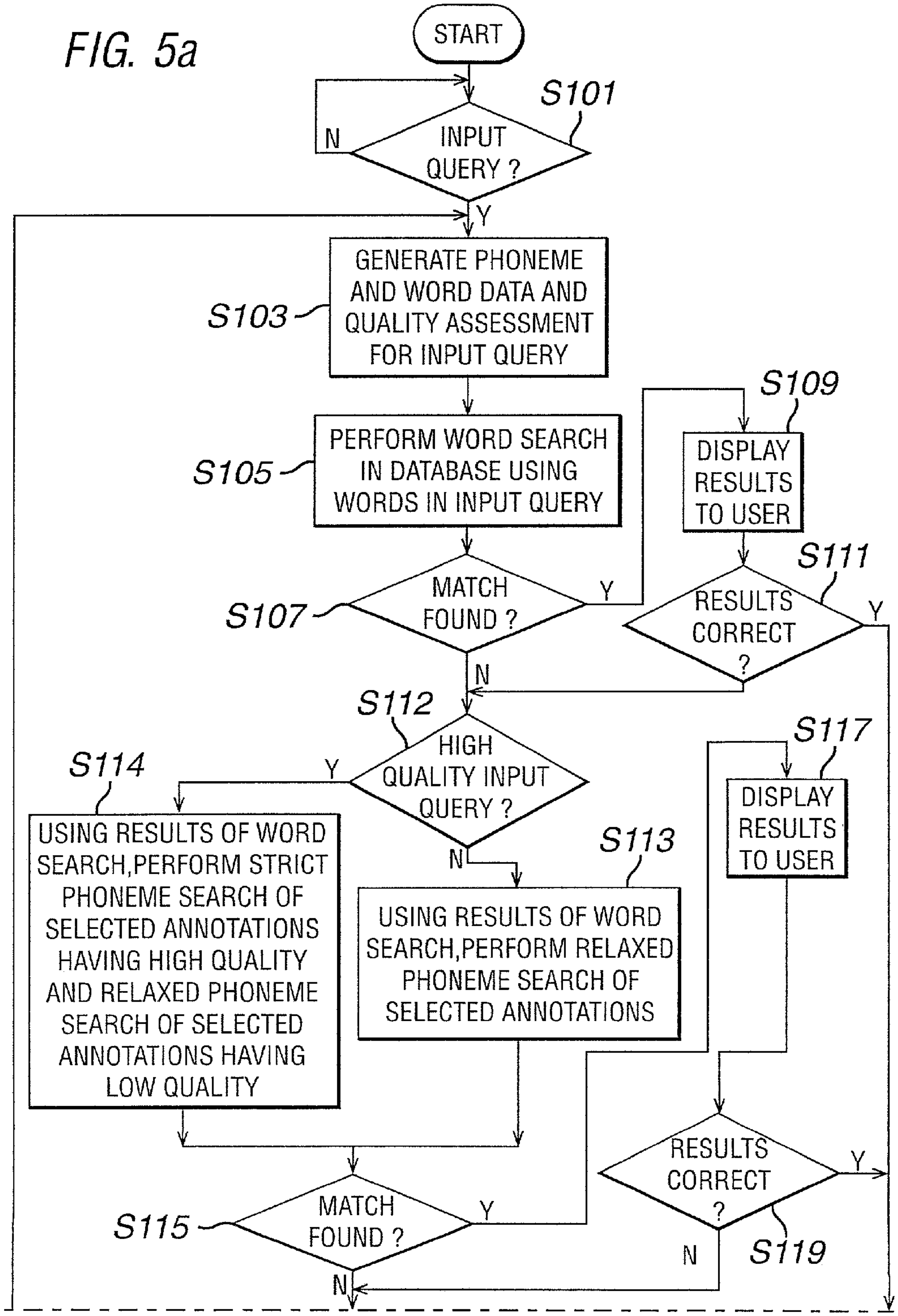
Figure 5B:
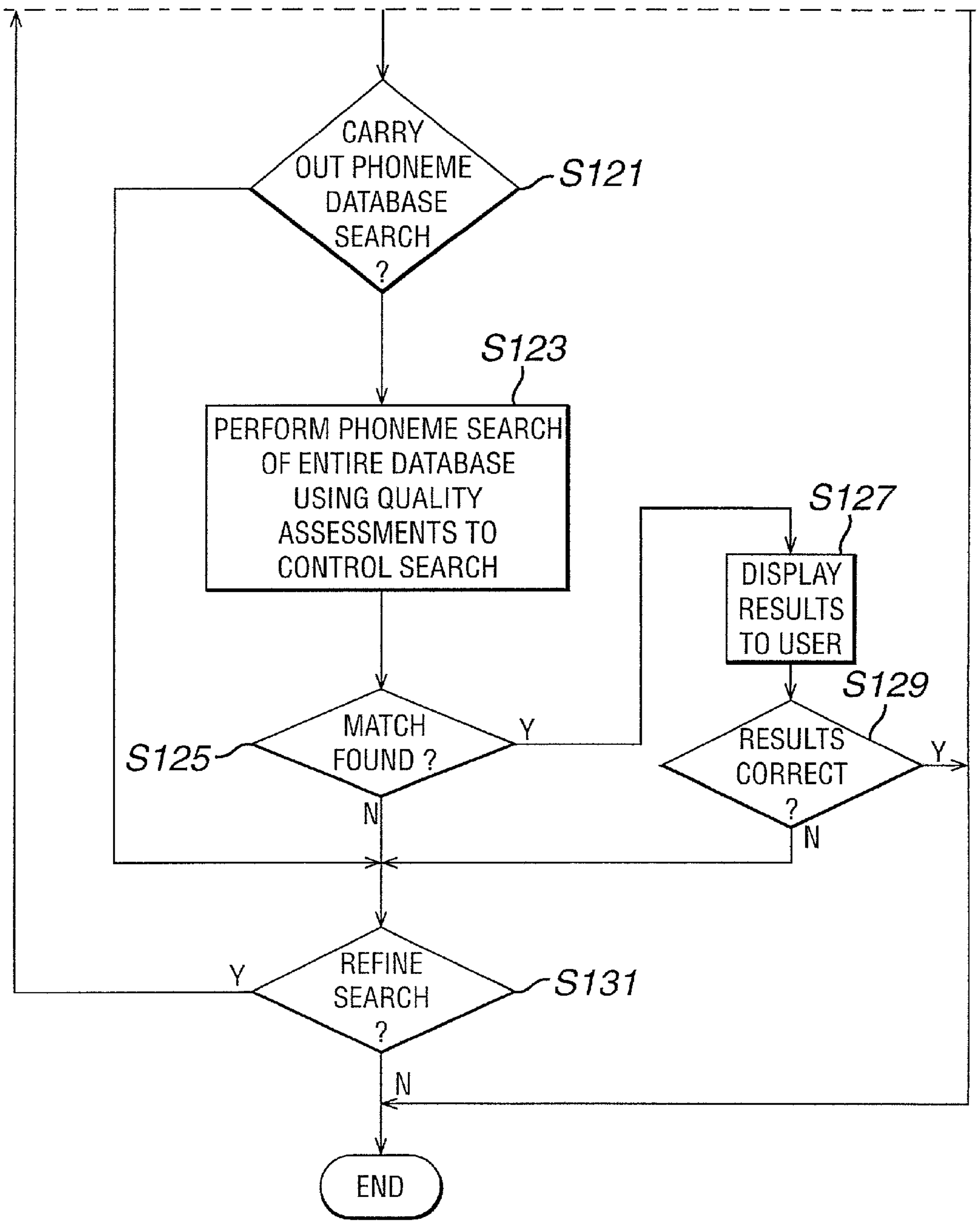
Figure 7:
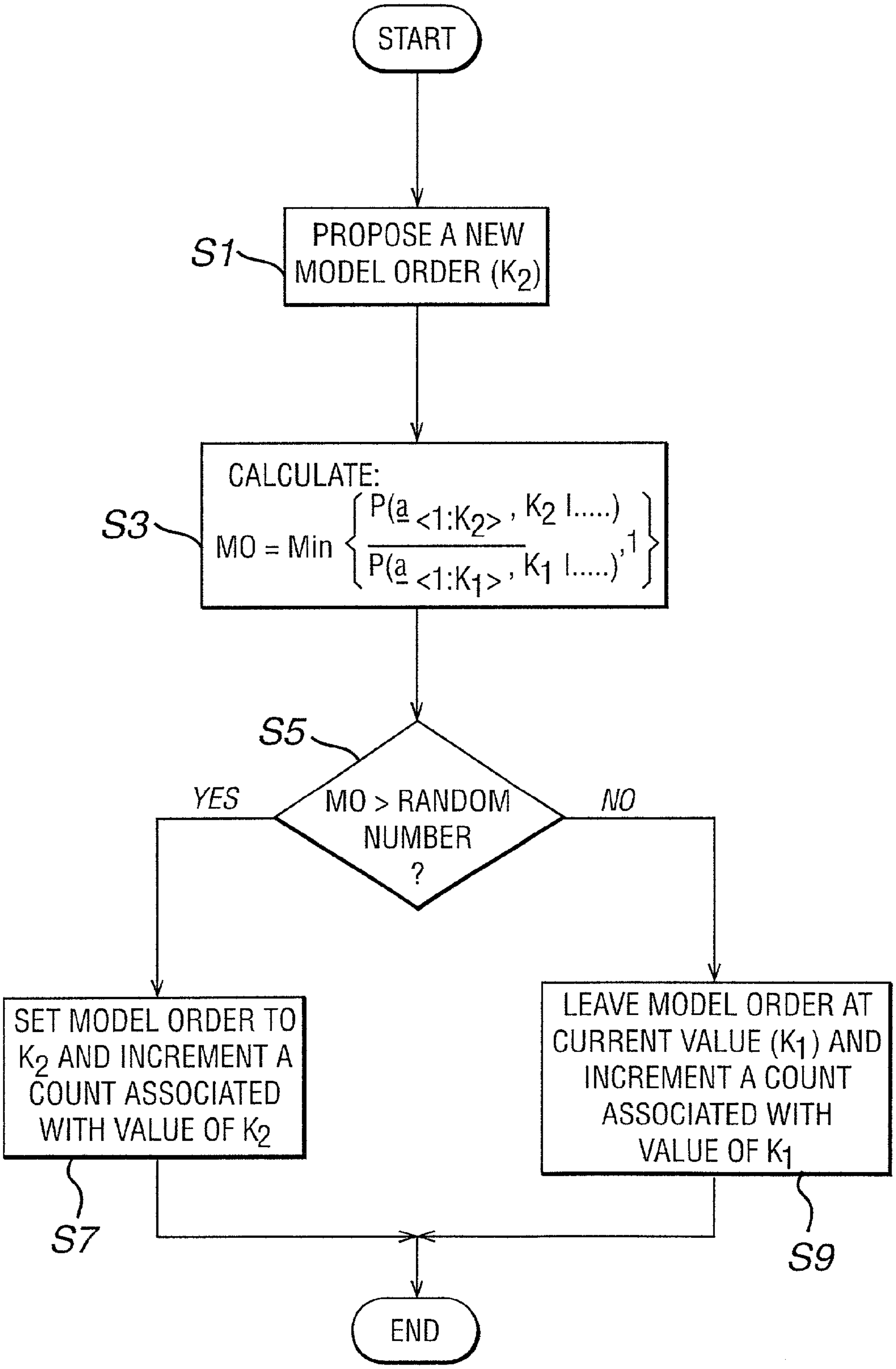
Figure 8:
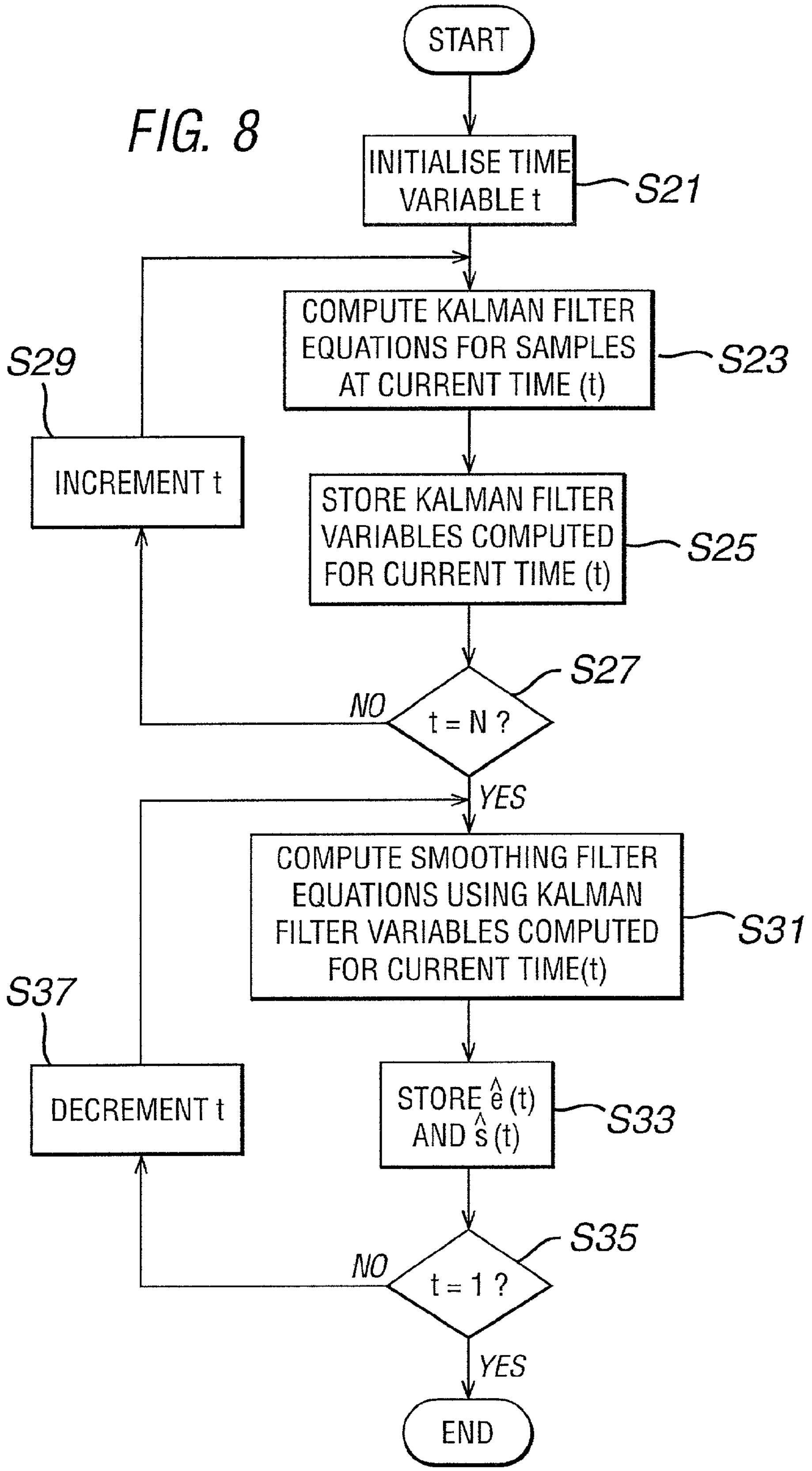
Figure 9:
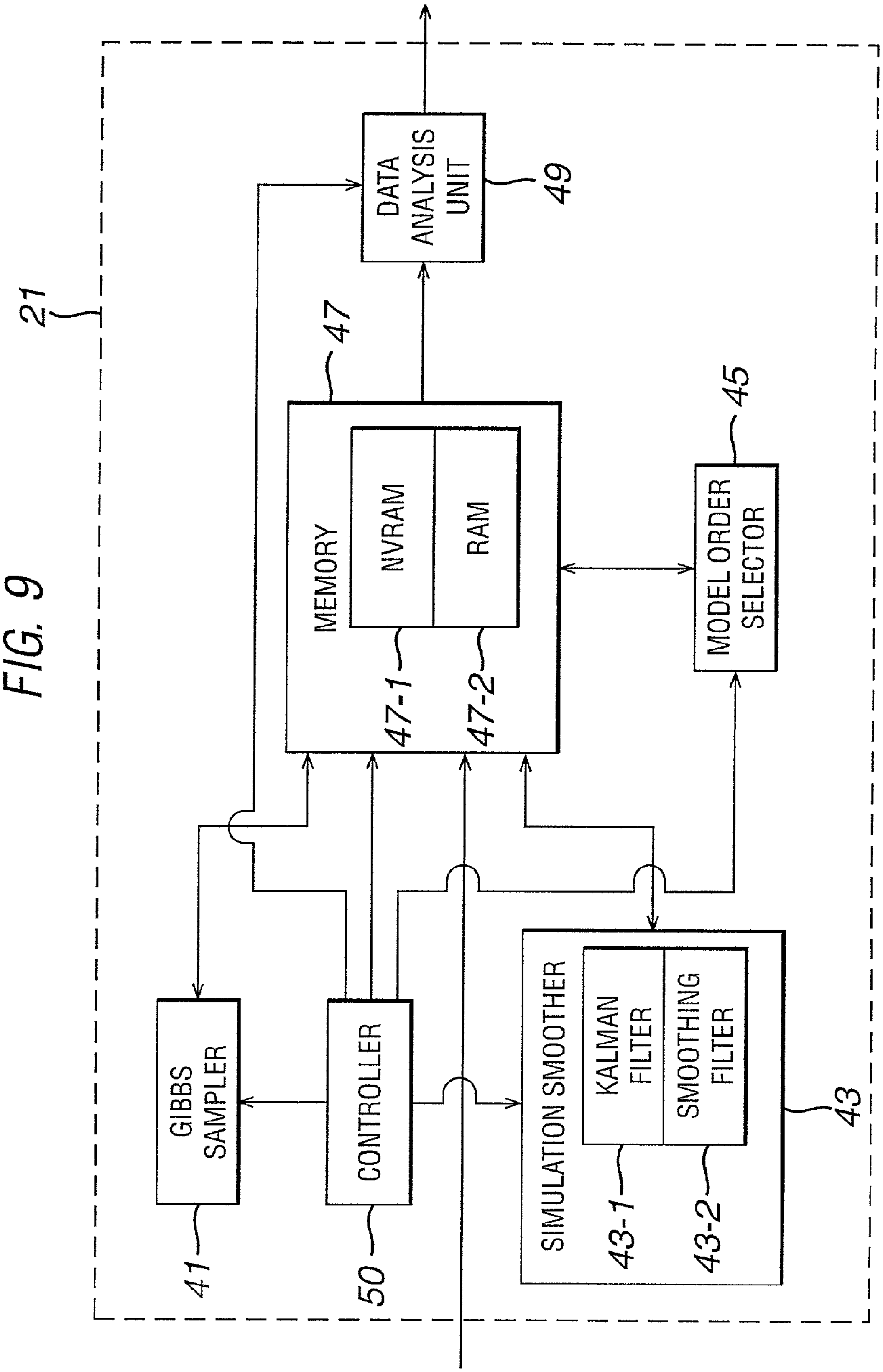
Figure 10:
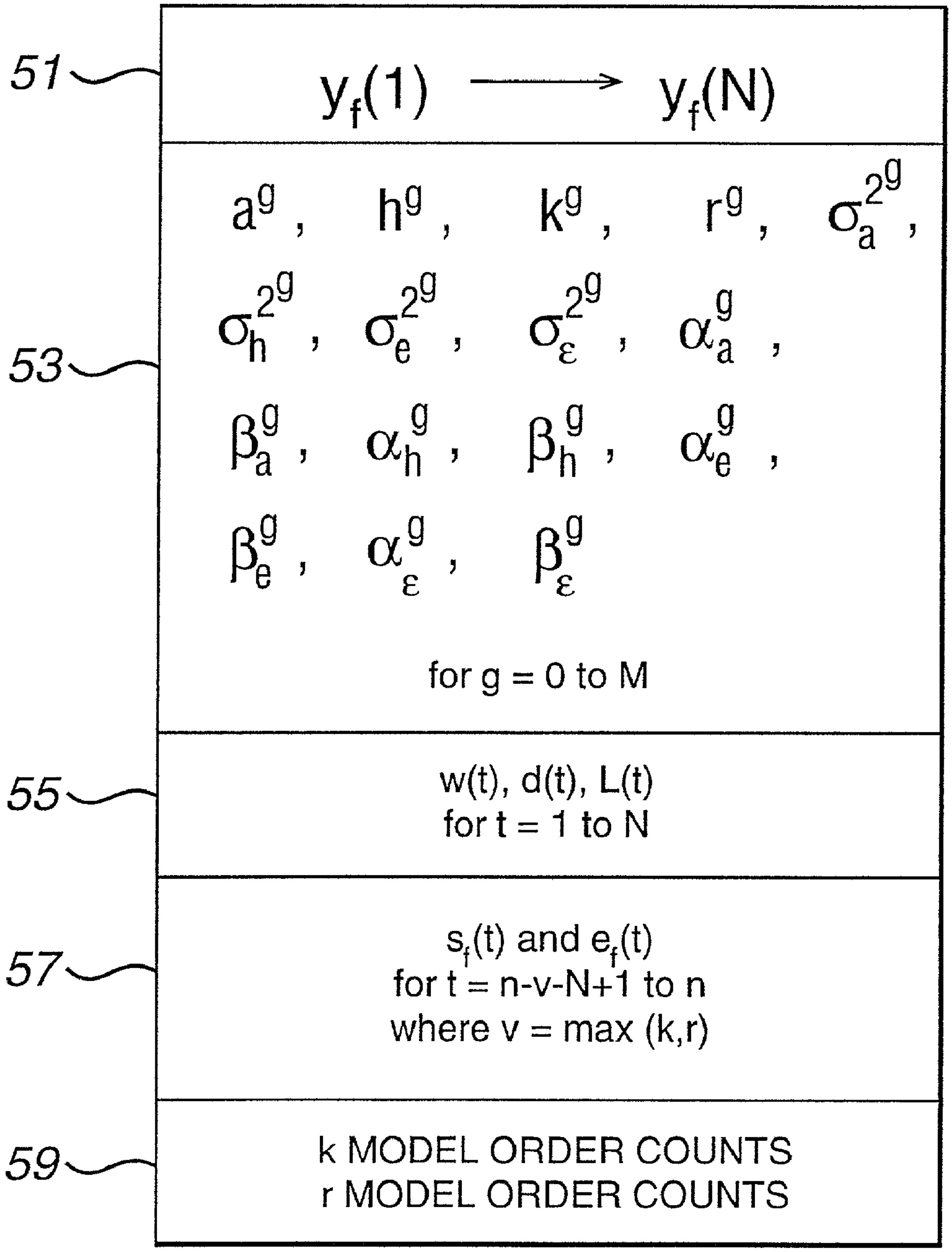
Figure 11:
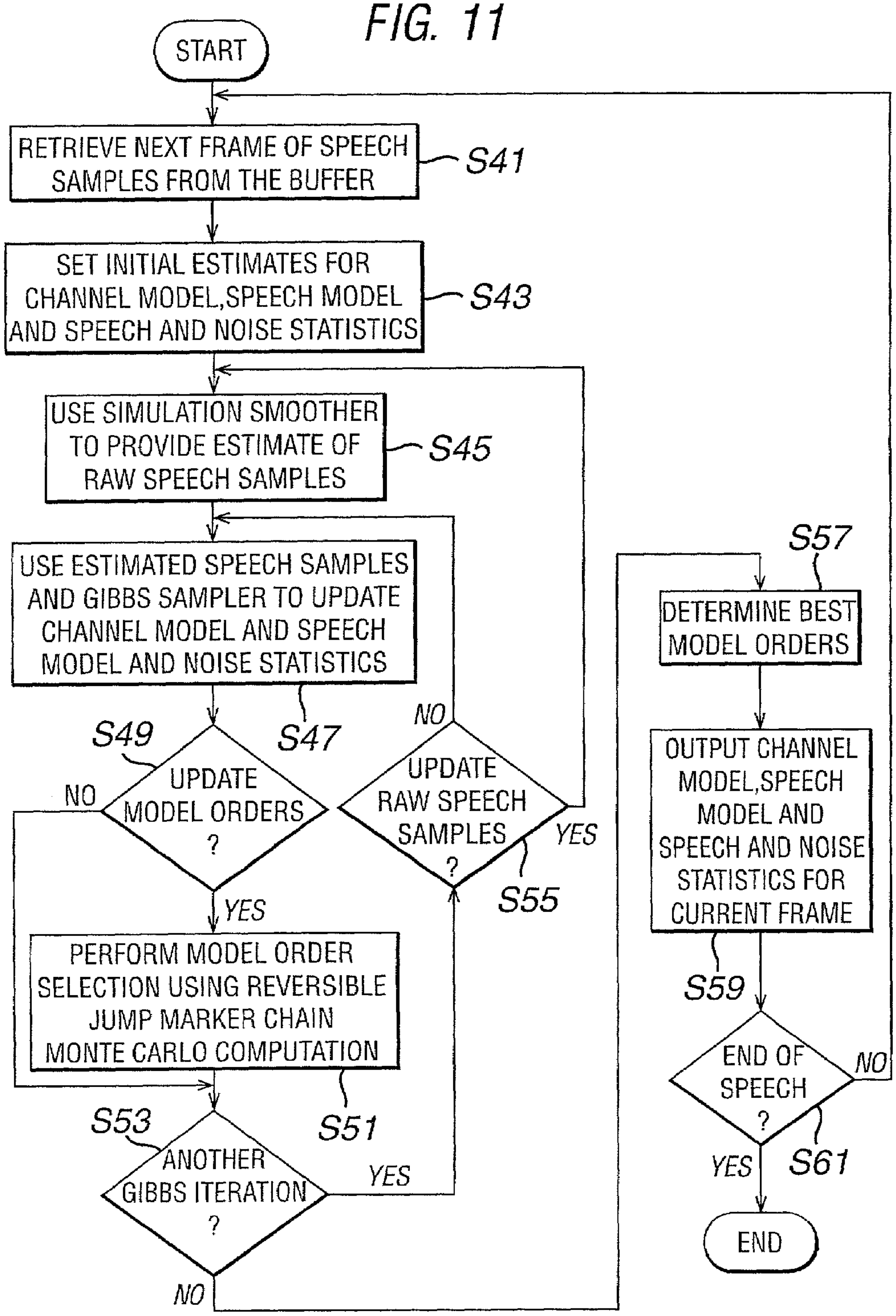
Figure 12A:
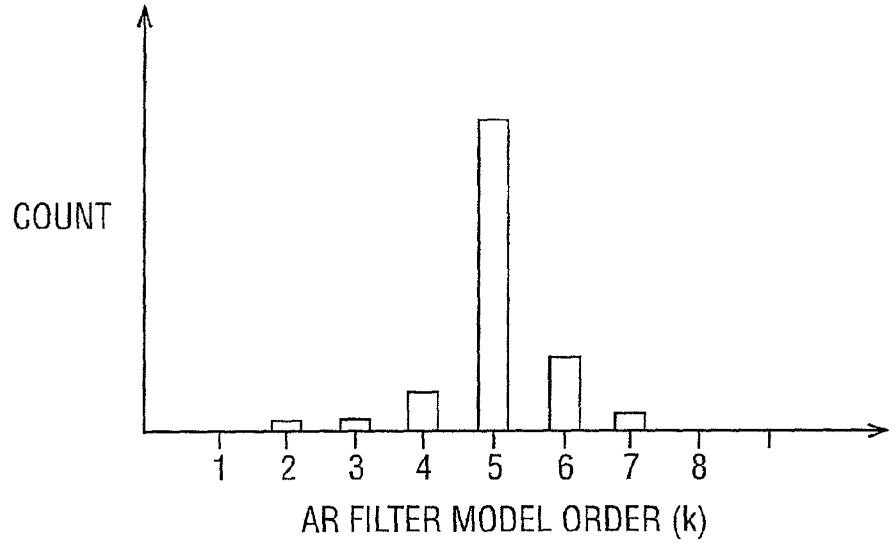
Figure 12B:
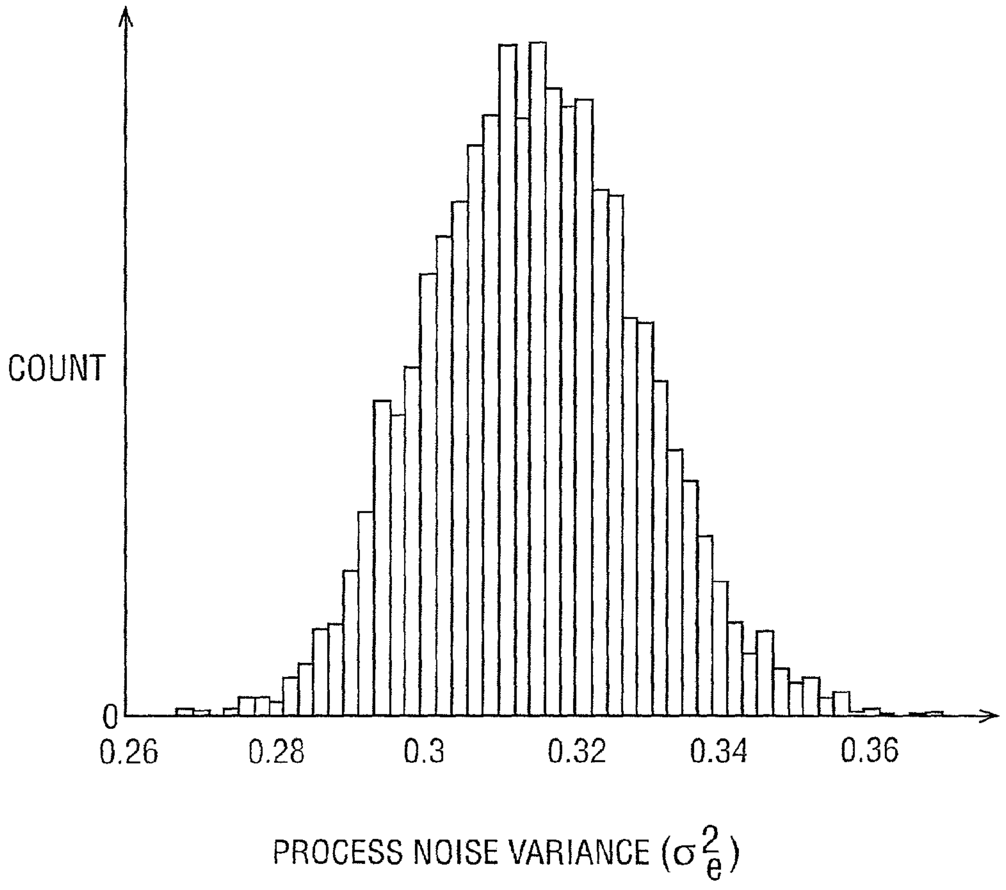
Figure 12C:
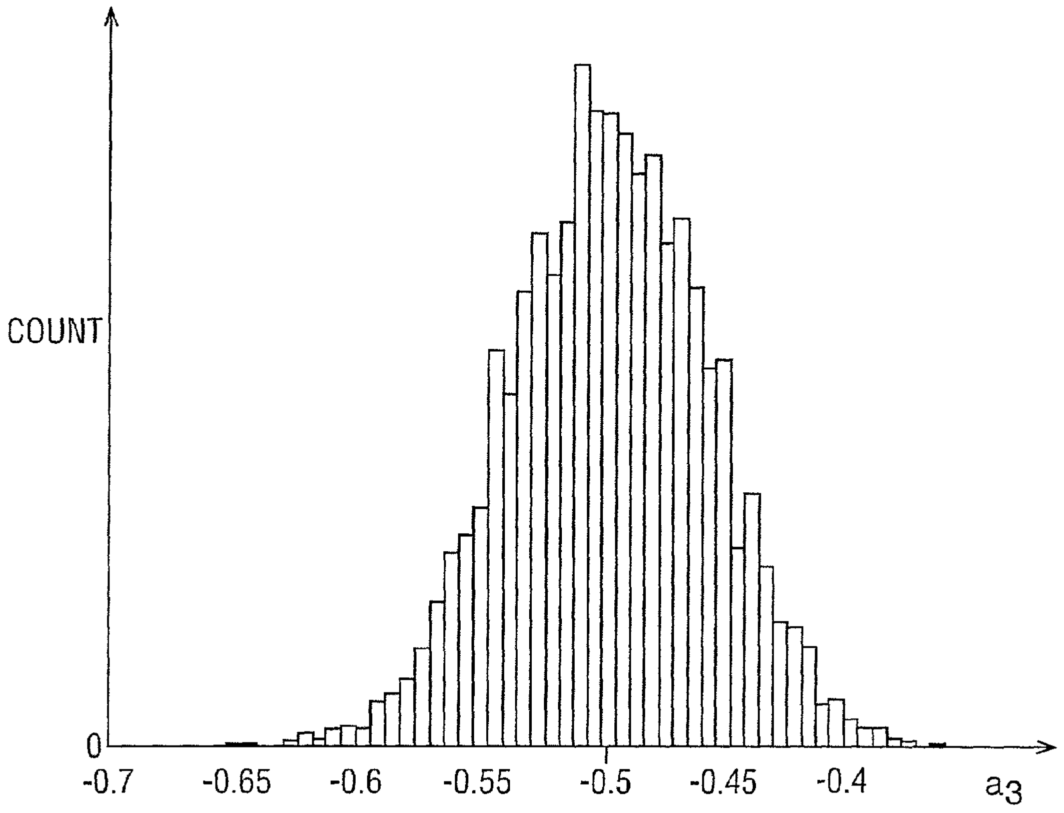
Figure 13:
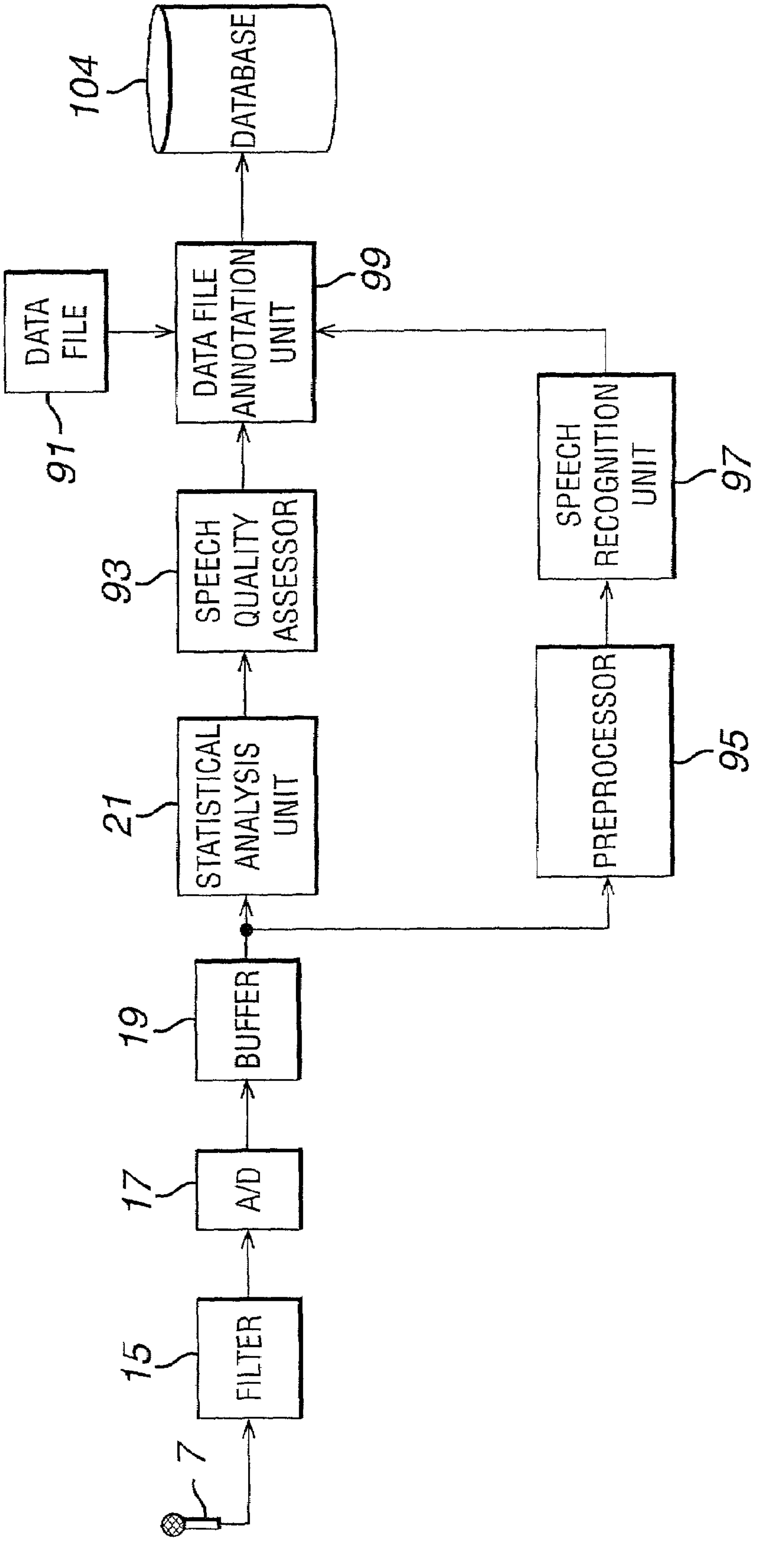
Figure 14:
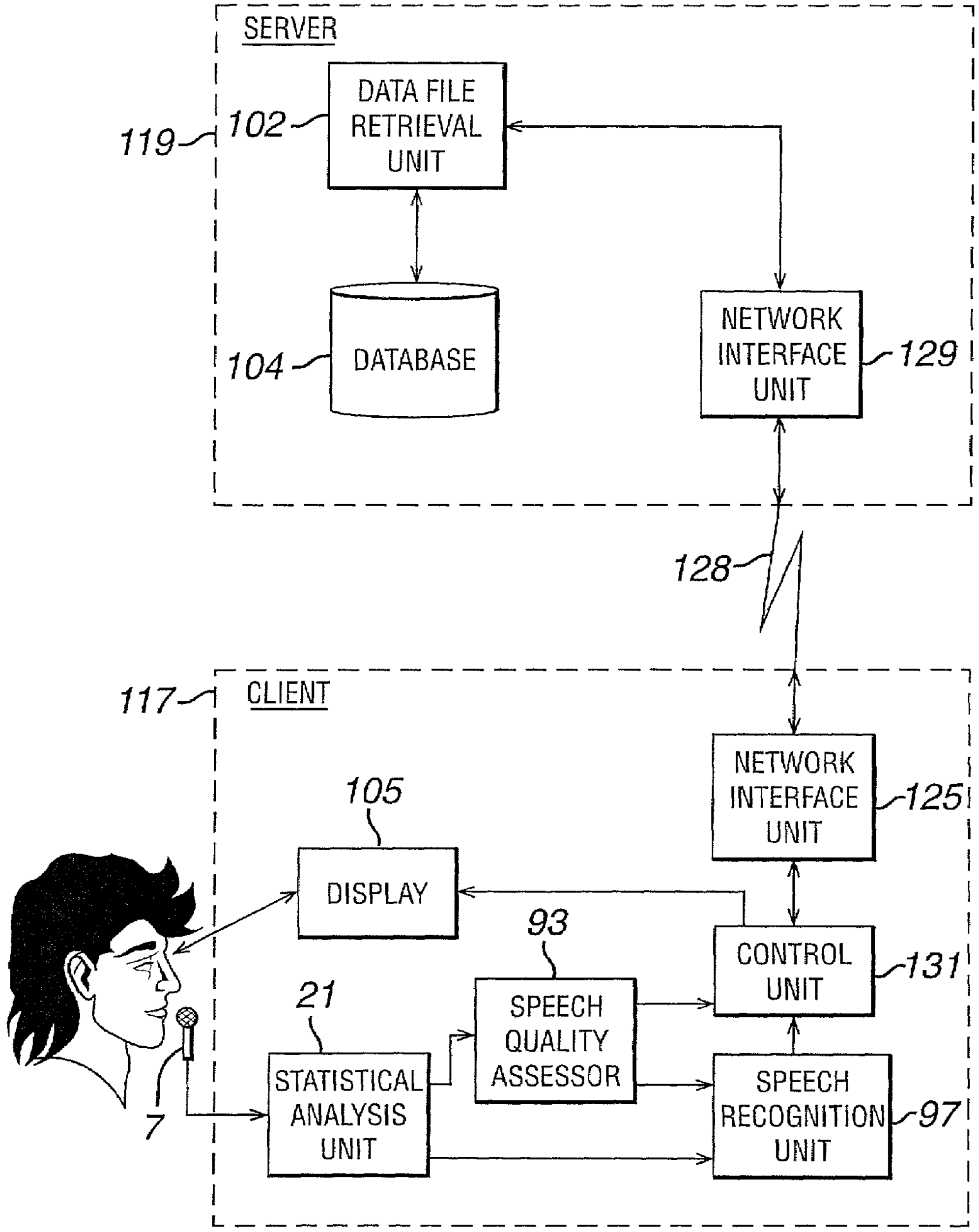

FIG. 5*a* is a flow diagram illustrating part of the flow control during a retrieval operation using the system shown in FIG. 4;

FIG. 5*b* is a flow diagram illustrating the remaining part of the flow control of the retrieval system shown in FIG. 4;

FIG. 6 is a block diagram representing a model employed by a statistical analysis unit which forms part of the data file annotation system shown in FIG. 2 and the data file retrieval system shown in FIG. 4;

FIG. 7 is a flow chart illustrating the processing steps performed by a model order selection unit forming part of the statistical analysis unit shown in FIGS. 2 and 4;

FIG. 8 is a flow chart illustrating the main processing steps employed by a Simulation Smoother which forms part of the statistical analysis unit shown in FIGS. 2 and 4;

FIG. 9 is a block diagram illustrating the main processing components of the statistical analysis unit shown in FIGS. 2 and 4;

FIG. 10 is a memory map illustrating the data that is stored in a memory which forms part of the statistical analysis unit shown in FIGS. 2 and 4;

FIG. 11 is a flow chart illustrating the main processing steps performed by the statistical analysis unit shown in FIG. 9;

FIG. 12*a* is a histogram for a model order of an auto regressive filter model which forms part of the model shown in FIG. 6;

FIG. 12*b* is a histogram for the variance of process noise modelled by the model shown in FIG. 6;

FIG. 12*c* is a histogram for a third coefficient of the AR filter model;

FIG. 13 is a block diagram illustrating the main components of an alternative data annotation system; and FIG. 14 is a schematic block diagram illustrating the form of a user terminal which is operable to retrieve a data file from a database located within a remote server in response to an input voice query.

Embodiments of the present invention can be implemented on computer hardware, but the embodiment to be described is implemented in software which is run in conjunction with processing hardware such as a personal computer, workstation, photocopier, facsimile machine or the like.

Figure 1:
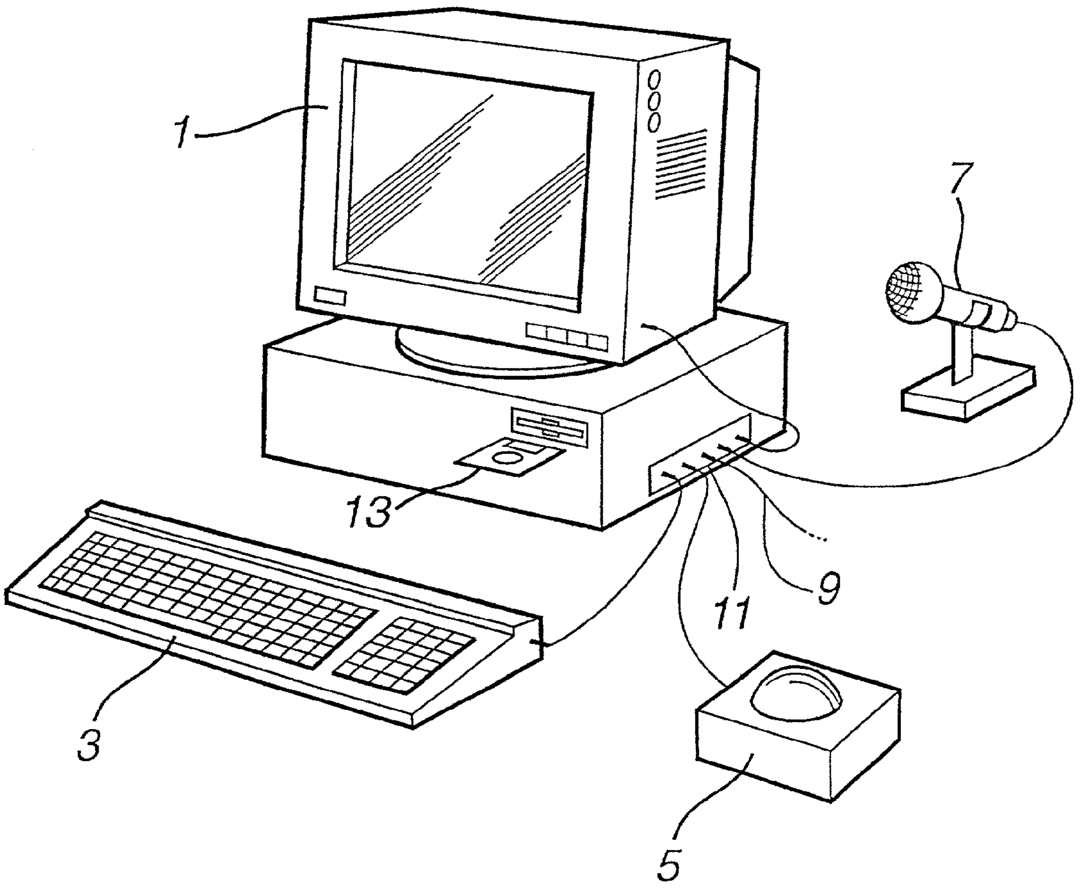
FIG. 1 is a schematic view of a computer which may be programmed to operate in accordance with an embodiment of the present invention.

FIG. 1 shows a personal computer (PC) 1 which may be programmed to operate an embodiment of the present invention. A keyboard 3, a pointing device 5, a microphone 7 and a telephone line 9 are connected to the PC 1 via an interface 11. The keyboard 3 and pointing device 5 allow the system to be controlled by a user. The microphone 7 converts the acoustic speech signal of the user into an equivalent electrical signal and supplies this to the PC 1 for processing. An internal modem and speech receiving circuit (not shown) may be connected to the telephone line 9 so that the PC 1 can communicate with, for example, a remote computer or with a remote user.

The program instructions which make the PC 1 operate in accordance with the present invention may be supplied for use with an existing PC 1 on, for example, a storage device such as a magnetic disc 13, or by downloading the software from the Internet (not shown) via the internal modem and telephone line 9.

Data File Annotation

The operation of a data file annotation system embodying the present invention will now be described with reference to FIG. 2. The system shown in FIG. 2 allows a user to add a voice annotation to a data file 91 for use in subsequent voice retrieval operations. In use, the user selects a data file to be annotated (which can be any kind of data file such as a video file, an audio file, a multi-media file or the like). The user then speaks the voice annotation towards microphone 7. Corresponding electrical signals output from the microphone 7 are then filtered by a filter 15 which removes unwanted frequencies (in this embodiment frequencies above 8 kHz) from the input signal. The filtered signal is then sampled (at a rate of 16 kHz) and digitised by an analogue to digital converter 17. The digitised speech samples are then stored in a buffer 19. Sequential blocks (or frames) of speech samples are then passed from the buffer 19 to a statistical analysis unit 21 which performs a statistical analysis of each frame of speech samples in sequence to determine a set of auto regressive (AR) coefficients representative of the speech within the frame and a measure of the quality of the input speech. In this embodiment, the quality measure is the variance of the AR coefficients.

The quality measure is output to a speech quality assessor 93 and the AR coefficients are output to a speech recognition unit 97. The speech recognition unit 25 compares the AR coefficients for successive frames of speech with a set of stored speech models (not shown), which may be template based or Hidden Markov model based, to generate a recognition result. In this embodiment, the speech recognition unit 97 outputs words and phonemes corresponding to the spoken annotation input by the user. As shown in FIG. 2, the output words and phonemes are input to a data file annotation unit 99 which also receives an assessment of the speech quality output by the speech quality assessor 93. In this embodiment, the speech quality assessor 93 determines whether or not the input speech is of a high quality (i.e. not disturbed by high levels of background noise) based on the variance data received from the statistical analysis unit 21. In particular, the variance of the AR coefficients should be smaller when the speech input is of a high quality than when there are high levels of noise. The data file annotation unit 99 then generates an annotation for the data file 91 from the words and phonemes output by the speech recognition unit 97 and the speech quality assessment output by the speech quality assessor 93. The data file 91 is then stored in the data file database 101 and the corresponding annotation data is stored in the annotation database 103.

As those skilled in the art will appreciate, the speech quality assessment which is stored with the annotation data is useful for subsequent retrieval operations. In particular, when the user wishes to retrieve a data file 91 from the database 101 (using a voice query), it is useful to know the quality of the speech that was used to annotate the data file and/or the quality of the voice query used to retrieve the data file, since this will affect the retrieval performance. More specifically, if the voice annotation is of a high quality and the user's voice query is also of a high quality, then a stringent search of the annotation database 103 should be performed, in order to reduce the amount of false identifications. In contrast, if the original voice annotation is of a low quality or if the user's voice query is of a low quality, then a less stringent search of the annotation database 103 should be performed so that there is a greater chance of retrieving the correct data file 91. The way in which this search is carried out will be described in more detail below.

Figure 3:
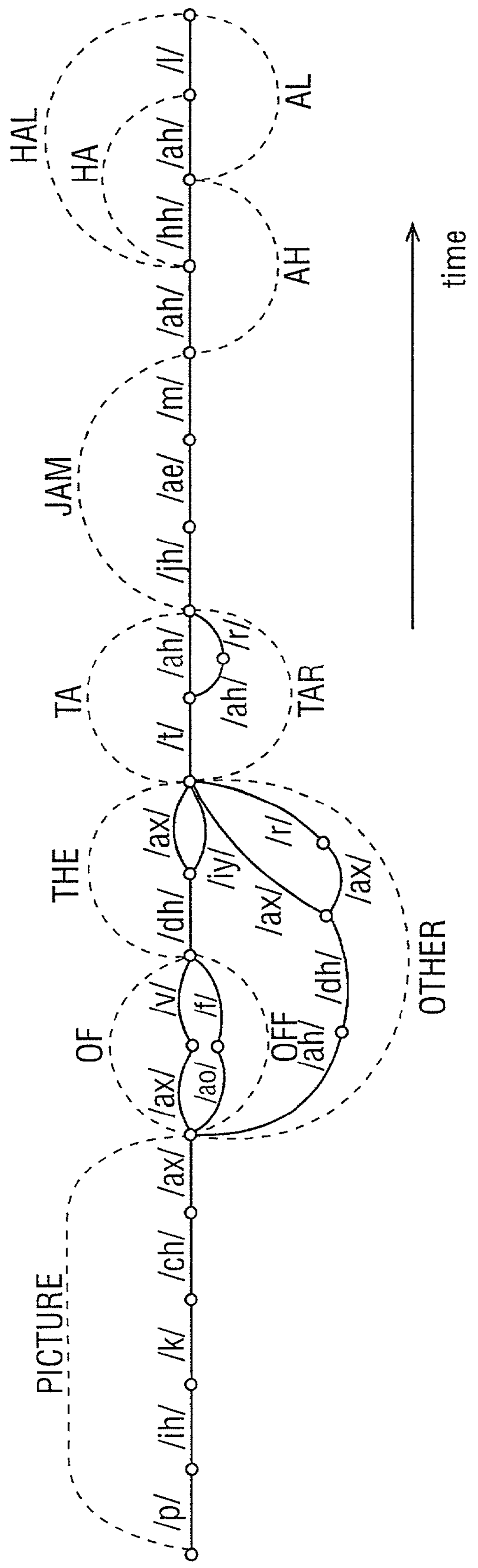
FIG. 3 is a schematic diagram of a word and phoneme lattice for an example audio string input by a user.

In this embodiment, the phoneme and word annotation data for a data file is stored in the annotation database 103 as a phoneme and word lattice. FIG. 3 schematically illustrates the form of the word and phoneme lattice generated for the spoken annotation "picture of the Taj Mahal". As shown, the word and phoneme lattice identifies a number of different phoneme and word strings which correspond to this spoken utterance. The phoneme and word lattice is an acyclic directed graph with a single entry point and a single exit point. It represents different parses of the spoken annotation. It is not simply a sequence of words with alternatives since each word does not have to be replaced by a single alternative, one word can be substituted for two or more words or phonemes and the whole structure can form a substitution for one or more words or phonemes. As those skilled in the art of speech recognition will realise, the use of phoneme data in addition to word data is more robust, because phonemes are dictionary independent and allow the system to cope with out of vocabulary words, such as names, places, foreign words etc. The use of phoneme data is also capable of making the system future proof, since it allows data files which are placed into the database to be retrieved even when the words are not understood by the original automatic speech recognition system.

In this embodiment, the annotation data stored in the annotation database 103 has the following general form:

Header
- time of start
- flag if word if phoneme if mixed
- time index associating the location of blocks of annotation data within memory to a given time point
- word set used (i.e. the dictionary)
- phoneme set used
- the language to which the language pertains
- speech quality assessment block(i) i=0, 1, 2, . . .
- node $N_j$ j=0, 1, 2, . . .
  - time offset of node from start of block
  - phoneme links(k) k=0, 1, 2, . . .
    - offset to node $N_j=N_k-N_j$ ($N_k$ is node to which link k extends) or if $N_k$ is in block(i+1) offset to node $N_j=N_k+N_b-N_j$ (where $N_b$ is the number of nodes in block(i))
    - phoneme associated with link(k)
  - word links(l) l=0, 1, 2 . . .
    - offset to node $N_j=N_i-N_j$ ($N_j$ is node to which link l extends) or if $N_k$ is in block(i+1) offset to node $N_j=N_k+N_b-N_j$ (where $N_b$ is the number of nodes in block(i))
    - word associated with link(l)

The time of start data in the header can identify the time and date of transmission of the data. For example the time of start may include the exact time of the spoken annotation and the date on which it was spoken.

The flag identifying if the annotation data is word annotation data, phoneme annotation data or if it is mixed is provided since not all of the annotation data in the annotation database 103 will include the combined phoneme and word lattice annotation data discussed above, and in this case, a different search strategy may be used to search this annotation data.

In this embodiment, the annotation data is divided into blocks in order to allow the search to jump into the middle of the annotation for a given audio data stream. The header therefore includes a time index which associates the location of the blocks of annotation data within the memory to a given time offset between the time of start and the time corresponding to the beginning of the block.

The header also includes data defining the word set used (i.e. the dictionary), the phoneme set used and the language to which the vocabulary pertains. The header may also include details of the automatic speech recognition system used to generate the annotation data and the appropriate settings thereof which are used during the generation of the annotation. Finally, as discussed above, the header also includes the speech quality assessment which identifies whether or not the spoken annotation is of a high quality.

The blocks of annotation data then follow the header and identify, for each node in the block, the time offset of the node from the start of the block, the phoneme links which connect that node to other nodes by phonemes and word links which connect that node to other nodes by words. Each phoneme link and word link identifies the phoneme or word which is associated with the link and the offset to the current node. For example, if node $N_{50}$ is linked to node $N_{55}$ by a phoneme link, then the offset to node $N_{50}$ for that link is 5. As those skilled in the art will appreciate, using an offset indication like this allows the division of the continuous annotation data into separate blocks.

Data File Retrieval

FIG. 4 is a block diagram illustrating the form of a data file retrieval system which can be used to retrieve the annotation data files from the database 101. This system may be, for example, a personal computer, a hand held device or the like. As shown, in this embodiment, the retrieval system is similar to the speech annotation systems shown in FIG. 2 except that the data file annotation unit 99 is replaced with a data file retrieval unit 102, and a display 105 is provided for displaying the search results. In operation, an input voice query is processed in the same way as the spoken annotation described above. The phoneme and word data corresponding to the user's input query is output from the speech recognition unit 97 to the data file retrieval unit 102. The data file retrieval unit 102 then searches the annotation database 103 using the generated phoneme and word data and a speech quality assessment output by the speech quality assessor 93 for the input query. The results of the search are then output to the user on the display 105.

FIGS. 5*a* and 5*b* are flow charts illustrating the flow control of the retrieval system shown in FIG. 4. As shown, initially in step s101, the system awaits an input query by the user. Upon receipt of the query, the system generates in step s103, phoneme and word data and a quality assessment for the input query. Processing then proceeds to step s105 where the data file retrieval unit 102 performs a word search in the annotation database 103 using the words in the query. The processing then proceeds to step s107 where the data file retrieval unit 102 determines whether or not a match has been found. If it has, then the data file retrieval unit 102 displays the results to the user on the display 105.

In this embodiment, the system then allows the user to consider the search results and awaits the user's confirmation as to whether or not the results correspond to the data file the user wishes to retrieve. If it is, then the processing proceeds from step sill to the end of the processing and the system returns to its idle state and awaits the next input query. If, however, the user indicates (by, for example, inputting an appropriate voice command) that the search results do not correspond to the desired data file, then the processing proceeds from step sill to step s112, where the data file retrieval unit 102 determines whether or not the user's input query is of a high quality. If it is not, then the processing proceeds to step s113 where the data file retrieval unit 102 uses the results of the word search to select a number of annotations and then performs a "relaxed" phoneme search of the selected annotations. The phoneme search is "relaxed" in the sense that the data file retrieval unit 102 does not discard annotations unless the phonemes of the annotation are very different to the phonemes for the input query.

If, on the other hand, the system determines at step s112 that the input query is of a high quality, then the processing proceeds to step s114 where the data file retrieval unit 102 again uses the results of the word search to select annotations and then uses a relaxed phoneme search for the selected annotations having a low quality assessment and a "stringent" phoneme search for annotations having a high quality assessment. The phoneme search is "stringent" in the sense that the data file retrieval unit 102 discards annotations quickly in the searching operation if there are significant differences between the annotation phonemes and the query phonemes.

After the phoneme searches have been performed, the processing proceeds to step s115 where the data file annotation unit 102 determines whether or not a match has been found. If a match has been found then the processing proceeds to step s117 where the results are displayed to the user on the display 105. If the search results are correct, then processing proceeds from step s119 to the end of the processing and the system returns to its idle state and awaits the next input query. If, on the other hand, the user indicates that the search results still do not correspond to the desired data file, then the processing passes to step s121 where the data file retrieval unit 102 queries the user, via the display 105, whether or not a phoneme search should be performed of the whole annotation database 103. If in response to this query, the user indicates that such a search should be performed, then the processing proceeds to step s123, where the data file retrieval unit 102 performs a phoneme search of the entire annotation database 103, again using the quality assessments for the input query and for the stored annotations to control the search strategy.

On completion of this search, the data file retrieval unit 102 identifies, in step s125, whether or not a match for the user's input query has been found. If a match is found, then the processing proceeds to step s127, where the data file retrieval unit 102 causes the search results to be displayed to the user on the display 105. If the search results are correct, then the processing proceeds from step s129 to the end of the processing and the system returns to its idle state and awaits the next input query. If on the other hand, the user indicates that the search results still do not correspond to the desired data file, then processing passes to step s131, where the data file retrieval unit 102 queries the user, via the display 105, whether or not the user wishes to redefine or amend the search query. If he does, then the processing returns to step s103 where the user's subsequent input query is processed in a similar manner. If the search is not to be redefined or amended, then the search results and the user's initial input query are discarded and the system returns to its idle state and awaits the next input query.

Details of the phoneme searches which can be performed in steps s113, s114 and s123 are described in co-pending applications PCT/GB00/00718 and GB 9925561.4, the contents of which are incorporated herein by reference.

A more detailed description will now be given of the statistical analysis unit 21 used in both the data file annotation system shown in FIG. 2 and the data file retrieval system shown in FIG. 4.

Statistical Analysis Unit—Theory and Overview

As mentioned above, the statistical analysis unit 21 analyses the speech within successive frames of the input speech signal. In most speech processing systems, the frames are overlapping. However, in this embodiment, the frames of speech are non-overlapping and have a duration of 20 ms which, with the 16 kHz sampling rate of the analogue to digital converter 17, results in a frame size of 320 samples.

In order to perform the statistical analysis on each of the frames, the analysis unit 21 assumes that there is an underlying process which generated each sample within the frame. The model of this process used in this embodiment is shown in FIG. 6. As shown, the process is modelled by a speech source 31 which generates, at time t=n, a raw speech sample s(n). Since there are physical constraints on the movement of the speech articulators, there is some correlation between neighbouring speech samples. Therefore, in this embodiment, the speech source 31 is modelled by an auto regressive (AR) process. In other words, the statistical analysis unit 21 assumes that a current raw speech sample (s(n)) can be determined from a linear weighted combination of the most recent previous raw speech samples, i.e.:

$$s(n)=a_1s(n-1)+a_2s(n-2)+\dots+a_ks(n-k)+e(n) \quad (1)$$

where $a_1, a_2 \dots a_k$ are the AR filter coefficients representing the amount of correlation between the speech samples; k is the AR filter model order; and e(n) represents random process noise which is involved in the generation of the raw speech samples. As those skilled in the art of speech processing will appreciate, these AR filter coefficients are the same coefficients that the linear prediction (LP) analysis estimates albeit using a different processing technique.

As shown in FIG. 6, the raw speech samples s(n) generated by the speech source are input to a channel 33 which models the acoustic environment between the speech source 31 and the output of the analogue to digital converter 17. Ideally, the channel 33 should simply attenuate the speech as it travels from the source 31 to the microphone. However, due to reverberation and other distortive effects, the signal (y(n)) output by the analogue to digital converter 17 will depend not only on the current raw speech sample (s(n)) but it will also depend upon previous raw speech samples. Therefore, in this embodiment, the statistical analysis unit 21 models the channel 33 by a moving average (MA) filter, i.e.:

$$y(n)=h_0s(n)+h_1s(n-1)+h_2s(n-2)+\dots+h_rs(n-r)+\epsilon(n) \quad (2)$$

where y(n) represents the signal sample output by the analogue to digital converter 17 at time t=n; $h_0, h_1, h_2 \dots h_r$ are the channel filter coefficients representing the amount of distortion within the channel 33; r is the channel filter model order; and $\epsilon(n)$ represents a random additive measurement noise component.

For the current frame of speech being processed, the filter coefficients for both the speech source and the channel are assumed to be constant but unknown. Therefore, considering all N samples (where N=320) in the current frame being processed gives:

$$s(n)=a_1s(n-1)+a_2s(n-2)+\dots+a_ks)(n-k)+e(n)$$

$$s(n-1)=a_1s(n-2)+a_2s(n-3)+\dots+a_ks(n-k-1)+e(n-1)$$

$$s(n-N+1)=a_1s(n-N)+a_2s(n-N-1)+\dots+a_ks(n-k-N+1)+e(n-N+1) \quad (3)$$

which can be written in vector form as:

$$\underline{s}(n)=S.\underline{a}+\underline{e}(n) \quad (4)$$

where $$S=\begin{bmatrix} s(n-1) & s(n-2) & s(n-3) & \cdots & s(n-k) \\ s(n-2) & s(n-3) & s(n-4) & \cdots & s(n-k-1) \\ s(n-3) & s(n-4) & s(n-5) & \cdots & s(n-k-2) \\ \vdots & & & \ddots & \\ s(n-N) & s(n-N-1) & s(n-N-2) & \cdots & s(n-k-N+1) \end{bmatrix}_{Nxk}$$

and $$\underline{a}=\begin{bmatrix} a_1 \\ a_2 \\ a_3 \\ \vdots \\ a_k \end{bmatrix}_{kx1} \quad \underline{s}(n)=\begin{bmatrix} s(n) \\ s(n-1) \\ s(n-2) \\ \vdots \\ s(n-N+1) \end{bmatrix}_{Nx1} \quad \underline{e}(n)=\begin{bmatrix} e(n) \\ e(n-1) \\ e(n-2) \\ \vdots \\ e(n-N+1) \end{bmatrix}_{Nx1}$$

As will be apparent from the following discussion, it is also convenient to rewrite equation (3) in terms of the random error component (often referred to as the residual) e(n). This gives:

$$e(n)=s(n)-a_1s(n-1)-a_2s(n-2)-\dots-a_ks(n-k)$$

$$e(n-1)=s(n-1)-a_1s(n-2)-a_2s(n-3)-\dots-a_ks(n-k-1)$$

$$e(n-N+1)=s(n-N+1)-a_1s(n-N)-a_2s(n-N-1)-\dots-a_ks(n-k-N+1) \quad (5)$$

which can be written in vector notation as:

$$\underline{e}(n)=\ddot{A}\underline{s}(n) \quad (6)$$

where $$\ddot{A}=\begin{bmatrix} 1 & -a_1 & -a_2 & -a_3 & \cdots & -a_k & 0 & 0 & 0 & \cdots & 0 \\ 0 & 1 & -a_1 & -a_2 & \cdots & -a_{k-1} & -a_k & 0 & 0 & \cdots & 0 \\ 0 & 0 & 1 & -a_1 & \cdots & -a_{k-2} & -a_{k-1} & -a_k & 0 & \cdots & 0 \\ \vdots & & & & \ddots & & & & & & \\ 0 & & & & & & & & & & 1 \end{bmatrix}_{NxN}$$

Similarly, considering the channel model defined by equation (2), with $h_0=1$ (since this provides a more stable solution), gives:

$$q(n)=h_1s(n-1)+h_2s(n-2)+\dots+h_rs(n-r)+\epsilon(n)$$

$$q(n-1)=h_1s(n-2)+h_2s(n-3)+\dots+h_rs(n-r-1)+\epsilon(n-1)$$

$$q(n-N+1)=h_1s(n-N)+h_2s(n-N-1)+\dots+h_rs(n-r-N+1)+\epsilon(n-N+1) \quad (7)$$

(where q(n)=y(n)−s(n)) which can be written in vector form as:

$$\underline{q}(n)=Y.\underline{h}+\underline{\epsilon}(n) \quad (8)$$

where $$Y=\begin{bmatrix} s(n-1) & s(n-2) & s(n-3) & \cdots & s(n-r) \\ s(n-2) & s(n-3) & s(n-4) & \cdots & s(n-r-1) \\ s(n-3) & s(n-4) & s(n-5) & \cdots & s(n-r-2) \\ \vdots & & & \ddots & \\ s(n-N) & s(n-N-1) & s(n-N-2) & \cdots & s(n-r-N+1) \end{bmatrix}_{Nxr}$$

and $$\underline{h}=\begin{bmatrix} h_1 \\ h_2 \\ h_3 \\ \vdots \\ h_r \end{bmatrix}_{rx1} \quad \underline{q}(n)=\begin{bmatrix} q(n) \\ q(n-1) \\ q(n-2) \\ \vdots \\ q(n-N+1) \end{bmatrix}_{Nx1} \quad \underline{\varepsilon}(n)=\begin{bmatrix} \varepsilon(n) \\ \varepsilon(n-1) \\ \varepsilon(n-2) \\ \vdots \\ \varepsilon(n-N+1) \end{bmatrix}_{Nx1}$$

In this embodiment, the analysis unit 21 aims to determine, amongst other things, values for the AR filter coefficients ($\underline{a}$) which best represent the observed signal samples ($\underline{y}$(n)) in the current frame. It does this by determining the AR filter coefficients ($\underline{a}$) that maximise the joint probability density function of the speech model, channel model, speech samples and the noise statistics given the observed signal samples output from the analogue to digital converter 17, i.e. by determining:

$$\max_{\underline{a}}\{p(\underline{a},k,\underline{h},r,\sigma_e^2,\sigma_\varepsilon^2,\underline{s}(n)\mid\underline{y}(n))\} \tag{9}$$

where $\sigma_e^2$ and $\sigma_\epsilon^2$ represent the process and measurement noise statistics respectively. As those skilled in the art will appreciate, this function defines the probability that a particular speech model, channel model, raw speech samples and noise statistics generated the observed frame of speech samples ($\underline{y}$(n)) from the analogue to digital converter. To do this, the statistical analysis unit 21 must determine what this function looks like. This problem can be simplified by rearranging this probability density function using Bayes law to give:

$$\frac{p(\underline{y}(n)\mid\underline{s}(n),\underline{h},r,\sigma_\varepsilon^2)p(\underline{s}(n)\mid\underline{a},k,\sigma_e^2)\;p(\underline{a}\mid k)p(\underline{h}\mid r)p(\sigma_\varepsilon^2)p(\sigma_e^2)p(k)p(r)}{p(\underline{y}(n))} \tag{10}$$

As those skilled in the art will appreciate, the denominator of equation (10) can be ignored since the probability of the signals from the analogue to digital converter is constant for all choices of model. Therefore, the AR filter coefficients that maximise the function defined by equation (9) will also maximise the numerator of equation (10).

Each of the terms on the numerator of equation (10) will now be considered in turn.

$p(\underline{s}(n)\mid\underline{a}, k, \sigma_e^2)$

This term represents the joint probability density function for generating the vector of raw speech samples ($\underline{s}$(n)) during a frame, given the AR filter coefficients ($\underline{a}$), the AR filter model order (k) and the process noise statistics ($\sigma_e^2$) From equation (6) above, this joint probability density function for the raw speech samples can be determined from the joint probability density function for the process noise. In particular $p(\underline{s}(n)\mid\underline{a}, k, \sigma_e^2)$ is given by:

$$p(\underline{s}(n)\mid\underline{a},k,\sigma_e^2)=p(\underline{e}(n))\left|\frac{\delta\underline{e}(n)}{\delta\underline{s}(n)}\right|_{\underline{e}(n)=\underline{s}(n)-S\underline{a}} \tag{11}$$

where $p(\underline{e}(n))$ is the joint probability density function for the process noise during a frame of the input speech and the second term on the right-hand side is known as the Jacobean of the transformation. In this case, the Jacobean is unity because of the triangular form of the matrix Ä (see equations (6) above).

In this embodiment, the statistical analysis unit 21 assumes that the process noise associated with the speech source 31 is Gaussian having zero mean and some unknown variance $\sigma_e^2$. The statistical analysis unit 21 also assumes that the process noise at one time point is independent of the process noise at another time point. Therefore, the joint probability density function for the process noise during a frame of the input speech (which defines the probability of any given vector of process noise $\underline{e}$(n) occurring) is given by:

$$p(\underline{e}(n))=(2\pi\sigma_e^2)^{-\frac{N}{2}}\exp\left[\frac{-\underline{e}(n)^T\underline{e}(n)}{2\sigma_e^2}\right] \tag{12}$$

Therefore, the joint probability density function for a vector of raw speech samples given the AR filter coefficients ($\underline{a}$), the AR filter model order (k) and the process noise variance ($\sigma_e^2$) is given by:

$$p(\underline{s}(n)\mid\underline{a},k,\sigma_e^2)=(2\pi\sigma_e^2)^{-\frac{N}{2}}\exp\left[\frac{-1}{2\sigma_e^2}(\underline{s}(n)^T\underline{s}(n)-2\underline{a}^TS\underline{s}(n)+\underline{a}^TS^TS\underline{a})\right] \tag{13}$$

$p(\underline{y}(n)\mid\underline{s}(n), \underline{h}, r, \sigma_\epsilon^2)$

This term represents the joint probability density function for generating the vector of speech samples ($\underline{y}$(n)) output from the analogue to digital converter 17, given the vector of raw speech samples ($\underline{s}$(n)), the channel filter coefficients ($\underline{h}$), the channel filter model order (r) and the measurement noise statistics ($\sigma_\epsilon^2$). From equation (8), this joint probability density function can be determined from the joint probability density function for the process noise. In particular, $p(\underline{y}(n)\mid\underline{s}(n), \underline{h}, r, \sigma_\epsilon^2)$ is given by:

$$p(\underline{y}(n)\mid\underline{s}(n),\underline{h},r,\sigma_\varepsilon^2)=p(\underline{\varepsilon}(n))\left|\frac{\delta\underline{\varepsilon}(n)}{\delta\underline{y}(n)}\right|_{\underline{\varepsilon}(n)=\underline{q}(n)-Y\underline{h}} \tag{14}$$

where $p(\underline{\epsilon}(n))$ is the joint probability density function for the measurement noise during a frame of the input speech and the second term on the right hand side is the Jacobean of the transformation which again has a value of one.

In this embodiment, the statistical analysis unit 21 assumes that the measurement noise is Gaussian having zero mean and some unknown variance $\sigma_\epsilon^2$. It also assumes that the measurement noise at one time point is independent of the measurement noise at another time point. Therefore, the joint probability density function for the measurement noise in a frame of the input speech will have the same form as the process noise defined in equation (12). Therefore, the joint probability density function for a vector of speech samples ($\underline{y}$(n)) output from the analogue to digital converter 17, given the channel filter coefficients ($\underline{h}$), the channel filter model order (r), the measurement noise statistics ($\sigma_\epsilon^2$) and the raw speech samples ($\underline{s}$(n)) will have the following form:

$$p(\underline{y}(n)\,|\,\underline{s}(n),\,\underline{h},\,r,\,\sigma_\varepsilon^2) = (2\pi\sigma_\varepsilon^2)^{-\frac{N}{2}}\exp\left[\frac{-1}{2\sigma_\varepsilon^2}(\underline{q}(n)^T\underline{q}(n) - 2\underline{h}^T Y\underline{q}(n) + \underline{h}^T Y^T Y\underline{h})\right] \tag{15}$$

As those skilled in the art will appreciate, although this joint probability density function for the vector of speech samples ($\underline{y}$(n)) is in terms of the variable $\underline{q}$(n), this does not matter since $\underline{q}$(n) is a function of $\underline{y}$(n) and $\underline{s}$(n), and $\underline{s}$(n) is a given variable (i.e. known) for this probability density function.

p($\underline{a}$|k)

This term defines the prior probability density function for the AR filter coefficients ($\underline{a}$) and it allows the statistical analysis unit 21 to introduce knowledge about what values it expects these coefficients will take. In this embodiment, the statistical analysis unit 21 models this prior probability density function by a Gaussian having an unknown variance ($\sigma_a^2$) and mean vector ($\underline{\mu}_a$) i.e.:

$$p(\underline{a}\,|\,k,\,\sigma_a^2,\,\underline{\mu}_a) = (2\pi\sigma_a^2)^{-\frac{N}{2}}\exp\left[\frac{-(\underline{a}-\underline{\mu}_a)^T(\underline{a}-\underline{\mu}_a)}{2\sigma_a^2}\right] \tag{16}$$

By introducing the new variables $\sigma_a^2$ and $\underline{\mu}_a$, the prior density functions (p($\sigma_a^2$) and p($\underline{\mu}_a$)) for these variables must be added to the numerator of equation (10) above. Initially, for the first frame of speech being processed the mean vector ($\underline{\mu}_a$) can be set to zero and for the second and subsequent frames of speech being processed, it can be set to the mean vector obtained during the processing of the previous frame. In this case, p($\underline{\mu}_a$) is just a Dirac delta function located at the current value of $\underline{\mu}_a$ and can therefore be ignored.

With regard to the prior probability density function for the variance of the AR filter coefficients, the statistical analysis unit 21 could set this equal to some constant to imply that all variances are equally probable. However, this term can be used to introduce knowledge about what the variance of the AR filter coefficients is expected to be. In this embodiment, since variances are always positive, the statistical analysis unit 21 models this variance prior probability density function by an Inverse Gamma function having parameters $\alpha_a$ and $\beta_a$, i.e.:

$$p(\sigma_a^2\,|\,\alpha_a,\,\beta_a) = \frac{(\sigma_a^2)^{-(\alpha_a+1)}}{\beta_a\Gamma(\alpha_a)}\exp\left[\frac{-1}{\sigma_a^2\beta_a}\right] \tag{17}$$

At the beginning of the speech being processed, the statistical analysis unit 21 will not have much knowledge about the variance of the AR filter coefficients. Therefore, initially, the statistical analysis unit 21 sets the variance $\sigma_a^2$ and the $\alpha$ and $\beta$ parameters of the Inverse Gamma function to ensure that this probability density function is fairly flat and therefore non-informative. However, after the first frame of speech has been processed, these parameters can be set more accurately during the processing of the next frame of speech by using the parameter values calculated during the processing of the previous frame of speech.

p($\underline{h}$|r)

This term represents the prior probability density function for the channel model coefficients ($\underline{h}$) and it allows the statistical analysis unit 21 to introduce knowledge about what values it expects these coefficients to take. As with the prior probability density function for the AR filter coefficients, in this embodiment, this probability density function is modelled by a Gaussian having an unknown variance ($\sigma_h^2$) and mean vector ($\underline{\mu}_h$), i.e.:

$$p(\underline{h}\,|\,r,\,\sigma_h^2,\,\underline{\mu}_h) = (2\pi\sigma_h^2)^{-\frac{N}{2}}\exp\left[\frac{-(\underline{h}-\underline{\mu}_h)^T(\underline{h}-\underline{\mu}_h)}{2\sigma_h^2}\right] \tag{18}$$

Again, by introducing these new variables, the prior density functions (p($\sigma_h$) and p($\underline{\mu}_h$)) must be added to the numerator of equation (10). Again, the mean vector can initially be set to zero and after the first frame of speech has been processed and for all subsequent frames of speech being processed, the mean vector can be set to equal the mean vector obtained during the processing of the previous frame. Therefore, p($\underline{\mu}_h$) is also just a Dirac delta function located at the current value of $\underline{\mu}_h$ and can be ignored.

With regard to the prior probability density function for the variance of the channel filter coefficients, again, in this embodiment, this is modelled by an Inverse Gamma function having parameters $\alpha_h$ and $\beta_h$. Again, the variance ($\sigma_h^2$) and the $\alpha$ and $\beta$ parameters of the Inverse Gamma function can be chosen initially so that these densities are non-informative so that they will have little effect on the subsequent processing of the initial frame.

p($\sigma_e^2$) and p($\sigma_\epsilon^2$)

These terms are the prior probability density functions for the process and measurement noise variances and again, these allow the statistical analysis unit 21 to introduce knowledge about what values it expects these noise variances will take. As with the other variances, in this embodiment, the statistical analysis unit 21 models these by an Inverse Gamma function having parameters $\alpha_e$, $\beta_e$ and $\alpha_\epsilon$, $\beta_\epsilon$ respectively. Again, these variances and these Gamma function parameters can be set initially so that they are non-informative and will not appreciably affect the subsequent calculations for the initial frame.

p(k) and p(r)

These terms are the prior probability density functions for the AR filter model order (k) and the channel model order (r) respectively. In this embodiment, these are modelled by a uniform distribution up to some maximum order. In this way, there is no prior bias on the number of coefficients in the models except that they can not exceed these predefined maximums. In this embodiment, the maximum AR filter model order (k) is thirty and the maximum channel model order (r) is one hundred and fifty.

Therefore, inserting the relevant equations into the numerator of equation (10) gives the following joint probability density function which is proportional to p(a,k,h,r,$\sigma_a^2$,$\sigma_h^2$,$\sigma_e^2$,$\sigma_\epsilon^2$,s(n)|y(n)):

$$(2\pi\sigma_\varepsilon^2)^{-\frac{N}{2}}\exp\left[\frac{-1}{2\sigma_\varepsilon^2}(\underline{q}(n)^T\underline{q}(n)-2\underline{h}^TY\underline{q}(n)+\underline{h}^TY^TY\underline{h})\right]\times \tag{19}$$
$$(2\pi\sigma_e^2)^{-\frac{N}{2}}\exp\left[\frac{-1}{2\sigma_e^2}(\underline{s}(n)^T\underline{s}(n)-2\underline{a}^TS\underline{s}(n)+\underline{a}^TS^TS\underline{a})\right]\times$$
$$(2\pi\sigma_a^2)^{-\frac{N}{2}}\exp\left[\frac{-(\underline{a}-\underline{\mu}_a)^T(\underline{a}-\underline{\mu}_a)}{2\sigma_a^2}\right]\times(2\pi\sigma_h^2)^{-\frac{N}{2}}$$
$$\exp\left[\frac{-(\underline{h}-\underline{\mu}_h)^T(\underline{h}-\underline{\mu}_h)}{2\sigma_h^2}\right]\times\frac{(\sigma_a^2)^{-(\alpha_a+1)}}{\beta_a\Gamma(\alpha_a)}$$
$$\exp\left[\frac{-1}{\sigma_a^2\beta_a}\right]\times\frac{(\sigma_h^2)^{-(\alpha_h+1)}}{\beta_h\Gamma(\alpha_h)}\exp\left[\frac{-1}{\sigma_h^2\beta_h}\right]\times$$
$$\frac{(\sigma_e^2)^{-(\alpha_e+1)}}{\beta_e\Gamma(\alpha_e)}\exp\left[\frac{-1}{\sigma_e^2\beta_e}\right]\times\frac{(\sigma_\varepsilon^2)^{-(\alpha_\varepsilon+1)}}{\beta_\varepsilon\Gamma(\alpha_\varepsilon)}\exp\left[\frac{-1}{\sigma_\varepsilon^2\beta_\varepsilon}\right]$$

Gibbs Sampler

In order to determine the form of this joint probability density function, the statistical analysis unit 21 "draws samples" from it. In this embodiment, since the joint probability density function to be sampled is a complex multivariate function, a Gibbs sampler is used which breaks down the problem into one of drawing samples from probability density functions of smaller dimensionality. In particular, the Gibbs sampler proceeds by drawing random variates from conditional densities as follows:

first iteration $$p(\underline{a},k\,|\,\underline{h}^0,r^0,\sigma_e^{2^0},\sigma_\varepsilon^{2^0}\sigma_h^{2^1},(\underline{s}(n))^0,\underline{y}(n))\to\underline{a}^1,k^1$$
$$p(\underline{h},r\,|\,\underline{a}^1,k^1,\sigma_e^{2^0},\sigma_\varepsilon^{2^0},\sigma_a^{2^0},\sigma_h^{2^0},\underline{s}(n)^0,\underline{y}(n))\to\underline{h}^1,k^1$$
$$p(\sigma_e^2\,|\,\underline{a}^1,k^1,\underline{h}^1,r^1,\sigma_\varepsilon^{2^0},\sigma_a^{2^0},\sigma_h^{2^1},\underline{s}(n)^0,\underline{y}(n))\to\sigma_e^{2^1}$$
$$\vdots$$
$$p(\sigma_h^{2^1}\,|\,\underline{a}^1,k^1,\underline{h}^1,r^1,\sigma_\varepsilon^{2^1},\sigma_a^{2^1},\sigma_h^{2^1},(\underline{s}(n))^0,\underline{y}(n))\to\sigma_h^{2^1}$$

second iteration $$p(\underline{a},k\,|\,\underline{h}^1,r^1,\sigma_e^{2^1},\sigma_\varepsilon^{2^1}\sigma_h^{2^1},(\underline{s}(n))^1,\underline{y}(n))\to\underline{a}^2,k^2$$
$$p(\underline{h},r\,|\,\underline{a}^2,k^2,\sigma_e^{2^1},\sigma_\varepsilon^{2^1},\sigma_a^{2^1},\sigma_h^{2^1},(s(n))^1,y(n))\to\underline{h}^2,r^2$$
$$\vdots$$

etc.

where ($h^0$, $r^0$, $(\sigma_e^2)^0$, $(\sigma_\epsilon^2)^0$, $(\sigma_a^2)^0$, $(\sigma_h^2)^0$, $\underline{s}(n)^0$) are initial values which may be obtained from the results of the statistical analysis of the previous frame of speech, or where there are no previous frames, can be set to appropriate values that will be known to those skilled in the art of speech processing.

As those skilled in the art will appreciate, these conditional densities are obtained by inserting the current values for the given (or known) variables into the terms of the density function of equation (19). For the conditional density p(a,k| . . . ) this results in:

$$p(\underline{a},k\,|\,\ldots)\propto\exp\left[\frac{-1}{2\sigma_e^2}(\underline{s}(n)^T\underline{s}(n)-2\underline{a}^TS\underline{s}(n)+\underline{a}^TS^TS\underline{a})\right]\times\exp\left[\frac{-(\underline{a}-\underline{\mu}_a)^T(\underline{a}-\underline{\mu}_a)}{2\sigma_a^2}\right] \tag{20}$$

which can be simplified to give:

$$p(\underline{a},k\,|\,\ldots)\propto\exp\left[\frac{-1}{2}\left(\frac{\underline{s}(n)^T\underline{s}(n)}{\sigma_e^2}+\frac{\underline{\mu}_a^T\underline{\mu}_a}{\sigma_a^2}-2\underline{a}^T\left[\frac{S\underline{s}(n)}{\sigma_e^2}+\frac{\underline{\mu}_a}{\sigma_a^2}\right]+\underline{a}^T\left[\frac{S^TS}{\sigma_e^2}+\frac{I}{\sigma_a^2}\right]\underline{a}\right)\right] \tag{21}$$

which is in the form of a standard Gaussian distribution having the following covariance matrix:

$$\sum_{\underline{a}}=\left[\frac{S^TS}{\sigma_e^2}+\frac{I}{\sigma_a^2}\right]^{-1} \tag{22}$$

The mean value of this Gaussian distribution can be determined by differentiating the exponent of equation (21) with respect to a and determining the value of a which makes the differential of the exponent equal to zero. This yields a mean value of:

$$\hat{\underline{\mu}}_a=\left[\frac{S^TS}{\sigma_e^2}+\frac{I}{\sigma_a^2}\right]^{-1}\left[\frac{S^T\underline{s}(n)}{\sigma_e^2}+\frac{\underline{\mu}_a}{\sigma_a^2}\right] \tag{23}$$

A sample can then be drawn from this standard Gaussian distribution to give $\underline{a}^g$ (where g is the $g^{th}$ iteration of the Gibbs sampler) with the model order ($k^g$) being determined by a model order selection routine which will be described later. The drawing of a sample from this Gaussian distribution may be done by using a random number generator which generates a vector of random values which are uniformly distributed and then using a transformation of random variables using the covariance matrix and the mean value given in equations (22) and (23) to generate the sample. In this embodiment, however, a random number generator is used which generates random numbers from a Gaussian distribution having zero mean and a variance of one. This simplifies the transformation process to one of a simple scaling using the covariance matrix given in equation (22) and shifting using the mean value given in equation (23). Since the techniques for drawing samples from Gaussian distributions are well known in the art of statistical analysis, a further description of them will not be given here. A more detailed description and explanation can be found in the book entitled "Numerical Recipes in C", by W. Press et al, Cambridge University Press, 1992 and in particular at chapter 7.

As those skilled in the art will appreciate, however, before a sample can be drawn from this Gaussian distribution, estimates of the raw speech samples must be available so that the matrix S and the vector s(n) are known. The way in which these estimates of the raw speech samples are obtained in this embodiment will be described later.

A similar analysis for the conditional density p(h,r| . . . ) reveals that it also is a standard Gaussian distribution but having a covariance matrix and mean value given by:

$$\sum_{h} = \left[\frac{Y^T Y}{\sigma_\varepsilon^2} + \frac{I}{\sigma_h^2}\right]^{-1} \tag{24}$$

$$\underline{\mu}_h = \left[\frac{Y^T Y}{\sigma_\varepsilon^2} + \frac{I}{\sigma_h^2}\right]^{-1}\left[\frac{Y^T \underline{q}(n)}{\sigma_\varepsilon^2} + \frac{\underline{\mu}_h}{\sigma_h^2}\right]$$

from which a sample for $\underline{h}^g$ can be drawn in the manner described above, with the channel model order ($r^g$) being determined using the model order selection routine which will be described later.

A similar analysis for the conditional density $p(\sigma_e^2| \ldots)$ shows that:

$$p(\sigma_e^2 | \ldots) \propto (\sigma_e^2)^{-\frac{N}{2}} \exp\left[\frac{-E}{2\sigma_e^2}\right] \frac{(\sigma_e^2)^{-(\alpha_e+1)}}{\beta_e \Gamma(\alpha_e)} \exp\left[\frac{-1}{\sigma_e^2 \beta_e}\right] \tag{25}$$

where:

$$E = \underline{s}(n)^T \underline{s}(n) - 2\underline{a}^T S \underline{s}(n) + \underline{a}^T S^T S \underline{a}$$

which can be simplified to give:

$$p(\sigma_e^2 | \ldots) \propto (\sigma_e^2)^{-[(\frac{N}{2}+\alpha_e)+1]} \exp\left[\frac{-1}{\sigma_e^2}\left(\frac{E}{2} + \frac{1}{\beta_e}\right)\right] \tag{26}$$

which is also an Inverse Gamma distribution having the following parameters:

$$\hat{\alpha}_e = \frac{N}{2} + \alpha_e \text{ and } \hat{\beta}_e = \frac{2\beta_e}{2 + \beta_e \cdot E} \tag{27}$$

A sample is then drawn from this Inverse Gamma distribution by firstly generating a random number from a uniform distribution and then performing a transformation of random variables using the alpha and beta parameters given in equation (27), to give $(\sigma_e^2)^g$.

A similar analysis for the conditional density $p(\sigma_\epsilon^2| \ldots)$ reveals that it also is an Inverse Gamma distribution having the following parameters:

$$\hat{\alpha}_\varepsilon = \frac{N}{2} + \alpha_\varepsilon \text{ and } \hat{\beta}_e = \frac{2\beta_\varepsilon}{2 + \beta_\varepsilon \cdot E^*} \tag{28}$$

where:

$$E^* = \underline{q}(n)^T \underline{q}(n) - 2\underline{h}^T Y \underline{q}(n) + \underline{h}^T Y^T Y \underline{h}$$

A sample is then drawn from this Inverse Gamma distribution in the manner described above to give $(\sigma_\epsilon^2)^g$.

A similar analysis for conditional density $p(\sigma_a^2| \ldots)$ reveals that it too is an Inverse Gamma distribution having the following parameters:

$$\hat{\alpha}_a = \frac{N}{2} + \alpha_a \text{ and } \hat{\beta}_a = \frac{2\beta_a}{2 + \beta_a \cdot (\underline{a} - \underline{\mu}_a)^T (\underline{a} - \underline{\mu}_a)} \tag{29}$$

A sample is then drawn from this Inverse Gamma distribution in the manner described above to give $(\sigma_a^2)^g$. Similarly, the conditional density $p(\sigma_h^2| \ldots)$ is also an Inverse Gamma distribution but having the following parameters:

$$\hat{\alpha}_h = \frac{N}{2} + \alpha_h \text{ and } \hat{\beta}_h = \frac{2\beta_h}{2 + \beta_h \cdot (\underline{h} - \underline{\mu}_h)^T (\underline{h} - \underline{\mu}_h)} \tag{30}$$

A sample is then drawn from this Inverse Gamma distribution in the manner described above to give $(\sigma_h^2)^g$.

As those skilled in the art will appreciate, the Gibbs sampler requires an initial transient period to converge to equilibrium (known as burn-in). Eventually, after L iterations, the sample $(\underline{a}^L, k^L, \underline{h}^L, r^L, (\sigma_e^2)^L, (\sigma_\epsilon^2)^L, (\sigma_a^2)^L, (\sigma_h^2)^L, s(n)^L)$ is considered to be a sample from the joint probability density function defined in equation (19). In this embodiment, the Gibbs sampler performs approximately one hundred and fifty (150) iterations on each frame of input speech and discards the samples from the first fifty iterations and uses the rest to give a picture (a set of histograms) of what the joint probability density function defined in equation (19) looks like. From these histograms, the set of AR coefficients (a) which best represents the observed speech samples (y(n)) from the analogue to digital converter 17 are determined. The histograms are also used to determine appropriate values for the variances and channel model coefficients (h) which can be used as the initial values for the Gibbs sampler when it processes the next frame of speech.

Model Order Selection

As mentioned above, during the Gibbs iterations, the model order (k) of the AR filter and the model order (r) of the channel filter are updated using a model order selection routine. In this embodiment, this is performed using a technique derived from "Reversible jump Markov chain Monte Carlo computation", which is described in the paper entitled "Reversible jump Markov chain Monte Carlo Computation and Bayesian model determination" by Peter Green, Biometrika, vol 82, pp 711 to 732, 1995.

FIG. 7 is a flow chart which illustrates the processing steps performed during this model order selection routine for the AR filter model order (k). As shown, in step s1, a new model order ($k_2$) is proposed. In this embodiment, the new model order will normally be proposed as $k_2=k_1\pm1$, but occasionally it will be proposed as $k_2=k_1\pm2$ and very occasionally as $k_2=k_1\pm3$ etc. To achieve this, a sample is drawn from a discretised Laplacian density function centered on the current model order ($k_1$) and with the variance of this Laplacian density function being chosen a priori in accordance with the degree of sampling of the model order space that is required.

The processing then proceeds to step s3 where a model order variable (MO) is set equal to:

$$MO = \max\left\{\frac{p(\underline{a}_{<1:k_2>}, k_2 \mid \ldots)}{p(\underline{a}_{<1:k_1>}, k_1 \mid \ldots)},\ 1\right\} \qquad (31)$$

where the ratio term is the ratio of the conditional probability given in equation (21) evaluated for the current AR filter coefficients ($\underline{a}$) drawn by the Gibbs sampler for the current model order ($k_1$) and for the proposed new model order ($k_2$). If $k_2>k_1$, then the matrix S must first be resized and then a new sample must be drawn from the Gaussian distribution having the mean vector and covariance matrix defined by equations (22) and (23) (determined for the resized matrix S), to provide the AR filter coefficients ($\underline{a}_{<1:k2>}$) for the new model order ($k_2$). If $k_2<k_1$ then all that is required is to delete the last ($k_1-k_2$) samples of the a vector. If the ratio in equation (31) is greater than one, then this implies that the proposed model order ($k_2$) is better than the current model order whereas if it is less than one then this implies that the current model order is better than the proposed model order. However, since occasionally this will not be the case, rather than deciding whether or not to accept the proposed model order by comparing the model order variable (MO) with a fixed threshold of one, in this embodiment, the model order variable (MO) is compared, in step s5, with a random number which lies between zero and one. If the model order variable (MO) is greater than this random number, then the processing proceeds to step s7 where the model order is set to the proposed model order ($k_2$) and a count associated with the value of $k_2$ is incremented. If, on the other hand, the model order variable (MO) is smaller than the random number, then the processing proceeds to step s9 where the current model order is maintained and a count associated with the value of the current model order ($k_1$) is incremented. The processing then ends.

This model order selection routine is carried out for both the model order of the AR filter model and for the model order of the channel filter model. This routine may be carried out at each Gibbs iteration. However, this is not essential. Therefore, in this embodiment, this model order updating routine is only carried out every third Gibbs iteration.

Simulation Smoother

As mentioned above, in order to be able to draw samples using the Gibbs sampler, estimates of the raw speech samples are required to generate $\underline{s}$(n), S and Y which are used in the Gibbs calculations. These could be obtained from the conditional probability density function $p(\underline{s}(n)| \ldots)$. However, this is not done in this embodiment because of the high dimensionality of $\underline{S}$(n). Therefore, in this embodiment, a different technique is used to provide the necessary estimates of the raw speech samples. In particular, in this embodiment, a “Simulation Smoother” is used to provide these estimates. This Simulation Smoother was proposed by Piet de Jong in the paper entitled “The Simulation Smoother for Time Series Models”, Biometrika (1995), vol 82, 2, pages 339 to 350. As those skilled in the art will appreciate, the Simulation Smoother is run before the Gibbs Sampler. It is also run again during the Gibbs iterations in order to update the estimates of the raw speech samples. In this embodiment, the Simulation Smoother is run every fourth Gibbs iteration.

In order to run the Simulation Smoother, the model equations defined above in equations (4) and (6) must be written in “state space” format as follows:

$$\hat{\underline{s}}(n)=\tilde{A}.\hat{\underline{s}}(n-1)+\hat{\underline{e}}(n)$$

$$y(n)=\underline{h}^T.\hat{\underline{s}}(n-1)+\epsilon(n) \qquad (32)$$

where $$\tilde{A} = \begin{bmatrix} a_1 & a_2 & a_3 & \cdots & a_k & 0 & \cdots & 0 \\ 1 & 0 & 0 & \cdots & 0 & 0 & \cdots & 0 \\ 0 & 1 & 0 & \cdots & 0 & 0 & \cdots & 0 \\ \vdots & & & \ddots & & & & \\ 0 & & & & & & 1 & 0 \end{bmatrix}_{r\times r}$$

and $$\hat{\underline{s}}(n) = \begin{bmatrix} \hat{s}(n) \\ \hat{s}(n-1) \\ \hat{s}(n-2) \\ \vdots \\ \hat{s}(n-r+1) \end{bmatrix}_{r\times 1} \qquad \hat{\underline{e}}(n) = \begin{bmatrix} \hat{e}(n) \\ 0 \\ 0 \\ \vdots \\ 0 \end{bmatrix}_{r\times 1}$$

With this state space representation, the dimensionality of the raw speech vectors ($\hat{\underline{s}}$(n)) and the process noise vectors ($\hat{\underline{e}}$(n)) do not need to be N×1 but only have to be as large as the greater of the model orders—k and r. Typically, the channel model order (r) will be larger than the AR filter model order (k). Hence, the vector of raw speech samples ( $\hat{\underline{s}}$(n)) and the vector of process noise ($\hat{\underline{e}}$(n)) only need to be r×1 and hence the dimensionality of the matrix Ã only needs to be r×r.

The Simulation Smoother involves two stages—a first stage in which a Kalman filter is run on the speech samples in the current frame and then a second stage in which a “smoothing” filter is run on the speech samples in the current frame using data obtained from the Kalman filter stage. FIG. 8 is a flow chart illustrating the processing steps performed by the Simulation Smoother. As shown, in step s21, the system initialises a time variable t to equal one. During the Kalman filter stage, this time variable is run from t=1 to N in order to process the N speech samples in the current frame being processed in time sequential order. After step s21, the processing then proceeds to step s23, where the following Kalman filter equations are computed for the current speech sample (y(t)) being processed:

$$w(t)=y(t)-\underline{h}^T\hat{\underline{s}}(t)$$

$$d(t)=\underline{h}^T P(t)\underline{h}+\sigma_e^2$$

$$\underline{k}_f(t)=(\tilde{A}P(t)\underline{h}).d(t)^{-1}$$

$$\hat{\underline{s}}(t+1)=\tilde{A}\hat{\underline{s}}(t)+\underline{k}_f(t).w(t)$$

$$L(t)=\tilde{A}-\underline{k}_f(t).\underline{h}^T$$

$$P(t+1)=\tilde{A}P(t)L(t)^T+\sigma_e^2.I \qquad (33)$$

where the initial vector of raw speech samples ($\hat{\underline{s}}$(1)) includes raw speech samples obtained from the processing of the previous frame (or if there are no previous frames then s(i) is set equal to zero for i<1); P(1) is the variance of $\hat{\underline{s}}$(1) (which can be obtained from the previous frame or initially can be set to $\sigma_e^2$); $\underline{h}$ is the current set of channel model coefficients which can be obtained from the processing of the previous frame (or if there are no previous frames then the elements of h can be set to their expected values—zero); y(t) is the current speech sample of the current frame being processed and I is the identity matrix. The processing then proceeds to step s25 where the scalar values w(t) and d(t) are stored together with the r×r matrix L(t) (or alternatively the Kalman filter gain vector $k_f(t)$ could be stored from which L(t) can be generated). The processing then proceeds to step s27 where the system determines whether or not all the speech samples in the current frame have been processed. If they have not, then the processing proceeds to step s29 where the time variable t is incremented by one so that the next sample in the current frame will be processed in the same way. Once all N samples in the current frame have been processed in this way and the corresponding values stored, the first stage of the Simulation Smoother is complete.

The processing then proceeds to step s31 where the second stage of the Simulation Smoother is started in which the smoothing filter processes the speech samples in the current frame in reverse sequential order. As shown, in step s31 the system runs the following set of smoothing filter equations on the current speech sample being processed together with the stored Kalman filter variables computed for the current speech sample being processed:

$$C(t)=\sigma_e^2(I-\sigma_e^2 U(t))$$

$$\underline{\eta}(t)\sim N(0,C(t))$$

$$V(t)=\sigma_e^2 U(t)L(t)$$

$$\underline{r}(t-1)=\underline{h}d(t)^{-1}w(t)+L(t)^T\underline{r}(t)-V(t)^T C(t)^{-1}\underline{\eta}(t)$$

$$U(t-1)=\underline{h}d(t)^{-1}\underline{h}^T+L(t)^T U(t)L(t)+V(t)^T C(t)^{-1}V(t)$$

$$\tilde{e}(t)=\sigma_e^2\underline{r}(t)+\underline{\theta}(t) \text{ where } \tilde{e}(t)=[\tilde{e}(t)\tilde{e}(t-1)\tilde{e}(t-2) \ldots \tilde{e}(t-r+1)]^T$$

$$\underline{\hat{s}}(t)=\tilde{A}\underline{\hat{s}}(t-1)+\underline{\hat{e}}(t) \text{ where } \underline{\hat{s}}(t)=[\hat{s}(t)\hat{s}(t-1)\hat{s}(t-2) \ldots \hat{s}(t-r+1)]^T$$

$$\text{and } \underline{\hat{e}}(t)=[\tilde{e}(t)\ 0\ 0 \ldots 0]^T \tag{34}$$

where $\underline{\eta}(t)$ is a sample drawn from a Gaussian distribution having zero mean and covariance matrix C(t); the initial vector $\underline{r}$(t=N) and the initial matrix U(t=N) are both set to zero; and $\underline{s}(0)$ is obtained from the processing of the previous frame (or if there are no previous frames can be set equal to zero). The processing then proceeds to step s33 where the estimate of the process noise (ẽ(t)) for the current speech sample being processed and the estimate of the raw speech sample (ŝ(t)) for the current speech sample being processed are stored. The processing then proceeds to step s35 where the system determines whether or not all the speech samples in the current frame have been processed. If they have not, then the processing proceeds to step s37 where the time variable t is decremented by one so that the previous sample in the current frame will be processed in the same way. Once all N samples in the current frame have been processed in this way and the corresponding process noise and raw speech samples have been stored, the second stage of the Simulation Smoother is complete and an estimate of $\underline{s}$(n) will have been generated.

As shown in equations (4) and (8), the matrix S and the matrix Y require raw speech samples s(n−N−1) to s(n−N−k+1) and s(n−N−1) to s(n−N−r+1) respectively in addition to those in $\underline{s}$(n). These additional raw speech samples can be obtained either from the processing of the previous frame of speech or if there are no previous frames, they can be set to zero. With these estimates of raw speech samples, the Gibbs sampler can be run to draw samples from the above described probability density functions.

Statistical Analysis Unit—Operation

A description has been given above of the theory underlying the statistical analysis unit 21. A description will now be given with reference to FIGS. 9 to 11 of the operation of the statistical analysis unit 21 that is used in the embodiment.

FIG. 9 is a block diagram illustrating the principal components of the statistical analysis unit 21 of this embodiment. As shown, it comprises the above described Gibbs sampler 41, Simulation Smoother 43 (including the Kalman filter 43-1 and smoothing filter 43-2) and model order selector 45. It also comprises a memory 47 which receives the speech samples of the current frame to be processed, a data analysis unit 49 which processes the data generated by the Gibbs sampler 41 and the model order selector 45 and a controller 50 which controls the operation of the statistical analysis unit 21.

As shown in FIG. 9, the memory 47 includes a non volatile memory area 47-1 and a working memory area 47-2. The non volatile memory 47-1 is used to store the joint probability density function given in equation (19) above and the equations for the variances and mean values and the equations for the Inverse Gamma parameters given above in equations (22) to (24) and (27) to (30) for the above mentioned conditional probability density functions for use by the Gibbs sampler 41. The non volatile memory 47-1 also stores the Kalman filter equations given above in equation (33) and the smoothing filter equations given above in equation 34 for use by the Simulation Smoother 43.

FIG. 10 is a schematic diagram illustrating the parameter values that are stored in the working memory area (RAM) 47-2. As shown, the RAM includes a store 51 for storing the speech samples $y_f(1)$ to $y_f(N)$ output by the analogue to digital converter 17 f or the current frame (f) being processed. As mentioned above, these speech samples are used in both the Gibbs sampler 41 and the Simulation Smoother 43. The RAM 47-2 also includes a store 53 for storing the initial estimates of the model parameters (g=0) and the M samples (g=1 to M) of each parameter drawn from the above described conditional probability density functions by the Gibbs sampler 41 for the current frame being processed. As mentioned above, in this embodiment, M is 100 since the Gibbs sampler 41 performs 150 iterations on each frame of input speech with the first fifty samples being discarded. The RAM 47-2 also includes a store 55 for storing W(t), d(t) and L(t) for t=1 to N which are calculated during the processing of the speech samples in the current frame of speech by the above described Kalman filter 43-1. The RAM 47-2 also includes a store 57 for storing the estimates of the raw speech samples (ŝf(t)) and the estimates of the process noise (ẽf(t)) generated by the smoothing filter 43-2, as discussed above. The RAM 47-2 also includes a store 59 for storing the model order counts which are generated by the model order selector 45 when the model orders for the AR filter model and the channel model are updated.

FIG. 11 is a flow diagram illustrating the control program used by the controller 50, in this embodiment, to control the processing operations of the statistical analysis unit 21. As shown, in step s41, the controller 50 retrieves the next frame of speech samples to be processed from the buffer 19 and stores them in the memory store 51. The processing then proceeds to step s43 where initial estimates for the channel model, raw speech samples and the process noise and measurement noise statistics are set and stored in the store 53. These initial estimates are either set to be the values obtained during the processing of the previous frame of speech or, where there are no previous frames of speech, are set to their expected values (which may be zero). The processing then proceeds to step s45 where the Simulation Smoother 43 is activated so as to provide an estimate of the raw speech samples in the manner described above. The processing then proceeds to step s47 where one iteration of the Gibbs sampler 41 is run in order to update the channel model, speech model and the process and measurement noise statistics using the raw speech samples obtained in step s45. These updated parameter values are then stored in the memory store 53.

The processing then proceeds to step s49 where the controller 50 determines whether or not to update the model orders of the AR filter model and the channel model. As mentioned above, in this embodiment, these model orders are updated every third Gibbs iteration. If the model orders are to be updated, then the processing proceeds to step s51 where the model order selector 45 is used to update the model orders of the AR filter model and the channel model in the manner described above. If at step s49 the controller 50 determines that the model orders are not to be updated, then the processing skips step s51 and the processing proceeds to step s53. At step s53, the controller 50 determines whether or not to perform another Gibbs iteration. If another iteration is to be performed, then the processing proceeds to decision block s55 where the controller 50 decides whether or not to update the estimates of the raw speech samples (s(t)). If the raw speech samples are not to be updated, then the processing returns to step s47 where the next Gibbs iteration is run.

As mentioned above, in this embodiment, the Simulation Smoother 43 is run every fourth Gibbs iteration in order to update the raw speech samples. Therefore, if the controller 50 determines, in step s55 that there has been four Gibbs iterations since the last time the speech samples were updated, then the processing returns to step s45 where the Simulation Smoother is run again to provide new estimates of the raw speech samples (s(t)). Once the controller 50 has determined that the required 150 Gibbs iterations have been performed, the controller 50 causes the processing to proceed to step s57 where the data analysis unit 49 analyses the model order counts generated by the model order selector 45 to determine the model orders for the AR filter model and the channel model which best represents the current frame of speech being processed. The processing then proceeds to step s59 where the data analysis unit 49 analyses the samples drawn from the conditional densities by the Gibbs sampler 41 to determine the AR filter coefficients ($\underline{a}$), the channel model coefficients ($\underline{h}$), the variances of these coefficients and the process and measurement noise variances which best represent the current frame of speech being processed. The processing then proceeds to step s61 where the controller 50 determines whether or not there is any further speech to be processed. If there is more speech to be processed, then processing returns to step S41 and the above process is repeated for the next frame of speech. Once all the speech has been processed in this way, the processing ends.

Data Analysis Unit

A more detailed description of the data analysis unit 49 will now be given with reference to FIG. 12. As mentioned above, the data analysis unit 49 initially determines, in step s57, the model orders for both the AR filter model and the channel model which best represents the current frame of speech being processed. It does this using the counts that have been generated by the model order selector 45 when it was run in step s51. These counts are stored in the store 59 of the RAM 47-2. In this embodiment, in determining the best model orders, the data analysis unit 49 identifies the model order having the highest count. FIG. 12*a* is an exemplary histogram which illustrates the distribution of counts that is generated for the model order (k) of the AR filter model. Therefore, in this example, the data analysis unit 49 would set the best model order of the AR filter model as five. The data analysis unit 49 performs a similar analysis of the counts generated for the model order (r) of the channel model to determine the best model order for the channel model.

Once the data analysis unit 49 has determined the best model orders (k and r), it then analyses the samples generated by the Gibbs sampler 41 which are stored in the store 53 of the RAM 47-2, in order to determine parameter values that are most representative of those samples. It does this by determining a histogram for each of the parameters from which it determines the most representative parameter value. To generate the histogram, the data analysis unit 49 determines the maximum and minimum sample value which was drawn by the Gibbs sampler and then divides the range of parameter values between this minimum and maximum value into a predetermined number of sub-ranges or bins. The data analysis unit 49 then assigns each of the sample values into the appropriate bins and counts how many samples are allocated to each bin. It then uses these counts to calculate a weighted average of the samples (with the weighting used for each sample depending on the count for the corresponding bin), to determine the most representative parameter value (known as the minimum mean square estimate (MMSE)). FIG. 12*b* illustrates an example histogram which is generated for the variance ($\sigma_e^2$) of the process noise, from which the data analysis unit 49 determines that the variance representative of the sample is 0.3149.

In determining the AR filter coefficients ($a_i$ for i=i to k), the data analysis unit 49 determines and analyses a histogram of the samples for each coefficient independently. FIG. 12*c* shows an exemplary histogram obtained for the third AR filter coefficient ($a_3$), from which the data analysis unit 49 determines that the coefficient representative of the samples is −0.4977.

In this embodiment, the data analysis unit 49 outputs the AR filter coefficients which are passed to the speech recognition unit 97 and the AR filter coefficient variance which is passed to the speech quality assessor 93. These parameters (and the remaining parameter values determined by the data analysis unit 49) are also stored in the RAM 47-2 for use during the processing of the next frame of speech.

As the skilled reader will appreciate, a speech processing technique has been described above which uses statistical analysis techniques to determine sets of AR filter coefficients representative of an input speech signal. The technique is more robust and accurate than prior art techniques which employ maximum likelihood estimators to determine the AR filter coefficients. This is because the statistical analysis of each frame uses knowledge obtained from the processing of the previous frame. In addition, with the analysis performed above, the model order for the AR filter model is not assumed to be constant and can vary from frame to frame. In this way, the optimum number of AR filter coefficients can be used to represent the speech within each frame. As a result, the AR filter coefficients output by the statistical analysis unit 21 will more accurately represent the corresponding input speech. Further still, since the underlying process model that is used separates the speech source from the channel, the AR filter coefficients that are determined will be more representative of the actual speech and will be less likely to include distortive effects of the channel. Further still, since variance information is available for each of the parameters, this provides an indication of the confidence of each of the parameter estimates. This is in contrast to maximum likelihood and least squares approaches, such as linear prediction analysis, where point estimates of the parameter values are determined.

Alternative Embodiments

In the above embodiment, the statistical analysis unit was effectively used as a pre-processor for a speech recognition system in order to generate AR coefficients representative of the input speech and also to provide a measure of the quality of the input speech signal for use in annotating a data file for use in subsequent retrieval operations. As those skilled in the art will appreciate, the AR coefficients and the speech quality measure generated by the statistical analysis unit 21 can be used in other applications. For example, it can be used in a speech transmission system in which speech to be transmitted is converted into corresponding AR coefficients which are then encoded for transmission. Various different encoding techniques may be employed, with the particular encoding technique used depending on the speech quality assessment output by the speech quality assessor. A suitable decoder at the receiver can then decode the transmitted data in order to retrieve the AR coefficients from which the speech may be resynthesised or recognised using a speech recognition unit. Alternatively still, the speech quality assessment may be used to control the operation of the speech recognition unit. In particular, if the reference models are high quality and if the user's input speech is also of a high quality, then the speech recognition system may compare the input speech with the stored models using a strict comparison technique. In contrast, if the input speech is of a low quality (and/or the models were generated from low quality speech), then the speech recognition unit may be arranged to perform a less strict comparison of the input speech with the models.

In addition to the variance of the AR filter coefficients being a good measure of the quality of the speech, the variance ($\sigma_e^2$) of the process noise is also a good measure of the quality of the input speech, since this variance is also measure of the energy in the process noise. Therefore, the variance of the process noise can be used in addition to or instead of the variance of the AR filter coefficients to provide the quality measure of the input speech to the speech quality assessor. Further still, one or more of the moving average (MA) coefficients may be used in addition to or instead of the variance of the AR filter coefficients, to provide the speech quality measure. This is because the MA filter coefficients represent how much distortion is added to the speech signal by the channel. For example, if all but the first MA filter coefficient are approximately zero, then little distortion will have been added by the channel and therefore, the speech quality will be high. In contrast, if the MA filter coefficients have larger values, then the received input speech will be of low quality as a result of the distortions caused by the channel.

In the above embodiment, the statistical analysis unit 21 operated as the front end to the speech recognition unit 97. As those skilled in the art will appreciate, in an alternative embodiment, a separate preprocessor may be provided to generate the AR filter coefficients, or other coefficients, such as cepstral coefficients, for use by the speech recognition unit 97. FIG. 13 illustrates a data file annotation system which operates in this way. As shown, the speech in the buffer 19 is processed by a preprocessor 95 in addition to being processed by the statistical analysis unit 21. However, such a separate preprocessing of the speech is not preferred, because of the additional processing overheads involved. Additionally, although a separate data file database 101 and annotation database 103 were used in the first embodiment described above, a single database may be used. This is also illustrated in FIG. 13 by the single database 104.

In the above embodiment, the speech recognition unit 97 used the AR filter coefficients output by the statistical analysis unit 21. Where the speech recognition unit 97 operates using different coefficients, then a suitable coefficient converter may be provided between the statistical analysis unit and the speech recognition unit.

As those skilled in the art will appreciate, this type of phonetic and word annotation of data files in a database provides a convenient and powerful way to allow a user to search the database by voice. In the illustrated embodiment, a single voice annotation was stored in the database associated with a corresponding data file so that the data file can be retrieved later by the user. As those skilled in the art will appreciate, when the data file to be annotated corresponds to a video data file, the annotation data may be generated from the audio within the data file itself. In this case, a single stream of annotation data may be generated for the audio data or separate phoneme and word lattice annotation data can be generated for the audio data of each speaker within the audio stream. This may be achieved by identifying, from the pitch or from another distinguishing feature of the speech signals, the audio data which corresponds to each of the speakers and then by annotating the different speakers audio separately. This may also be achieved if the audio data was recorded in stereo or if an array of microphones were used in generating the audio data, since it is then possible to process the audio data to extract the data for each speaker.

In the above embodiment, a data file was annotated using a voice annotation. As those skilled in the art will appreciate, other techniques can be used to input the annotation. For example, the user may type in the annotation to be added to the data file. In this case, the typed input would be converted by a phonetic transcription unit into the phoneme and word lattice annotation data using an internal phonetic dictionary. Also, in this case, such annotation data would have a high quality assessment since it is unlikely that there will be any decoding errors.

In the above embodiments, a phoneme and word lattice was used to annotate the data files. As those skilled in the art will appreciate, this is not essential. The annotation may simply be formed from phonemes or from words only. Further, as those skilled in the art will appreciate, the word "phoneme" in this context is not limited to its linguistic meaning but includes the various sub-word units that are identified and used in standard speech recognition systems, such as phones, syllables, Kata Kana (Japanese alphabet) etc.

In the above embodiment, the annotation database, the data file database and the speech recognition unit were all located within the same system. As those skilled in the art will appreciate, this is not essential. For example, FIG. 14 illustrates an embodiment in which the database 104 (which includes both the data files and the annotations) and the data file retrieval unit 102 are located in a remote server 119 and in which a user terminal 117 accesses and controls data files in the database 104 via the network interface units 125 and 129 and a data network 127 (such as the Internet). In operation, the user inputs a voice query via the microphone 7 which is processed by the statistical analysis unit 21 in the manner described above. For clarity, the filter 15, A/D converter 17 and the buffer 19 have been omitted from FIG. 14. The AR coefficients output by the statistical analysis unit 21 are passed to the speech recognition unit 97 and the variance of the AR coefficients is output to the speech quality accesor 93, as before. The phoneme and word data output by the speech recognition unit 97 and the speech quality assessment output by the speech quality assessor 93 are input to the control unit 131 which controls the transmission of this data over the data network 127 to the data file retrieval unit 102 located within the remote server 119. Upon receipt of this data, the data file retrieval unit 102 searches the database 104 in the manner described above. The data retrieved from the database 104 or other data relating to the search is then transmitted back, via the data network 68, to the control unit 131 which controls the display of the appropriate data on the display 105. In this way, it is possible to retrieve and control data files in the remote server 119 without using significant computer resources in the server (since it is the user terminal 117 which converts the input speech into the phoneme and word data and provides the speech quality assessment).

In the above embodiments, Gaussian and Inverse Gamma distributions were used to model the various prior probability density functions of equation (19). As those skilled in the art of statistical analysis will appreciate, the reason these distributions were chosen is that they are conjugate to one another. This means that each of the conditional probability density functions which are used in the Gibbs sampler will also either be Gaussian or Inverse Gamma. This therefore simplifies the task of drawing samples from the conditional probability densities. However, this is not essential. The noise probability density functions could be modelled by Laplacian or student-t distributions rather than Gaussian distributions. Similarly, the probability density functions for the variances may be modelled by a distribution other than the Inverse Gamma distribution. For example, they can be modelled by a Rayleigh distribution or some other distribution which is always positive. However, the use of probability density functions that are not conjugate will result in increased complexity in drawing samples from the conditional densities by the Gibbs sampler.

Additionally, whilst the Gibbs sampler was used to draw samples from the probability density function given in equation (19), other sampling algorithms could be used. For example the Metropolis-Hastings algorithm (which is reviewed together with other techniques in a paper entitled "Probabilistic inference using Markov chain Monte Carlo methods" by R. Neal, Technical Report CRG-TR-93-1, Department of Computer Science, University of Toronto, 1993) may be used to sample this probability density.

In the above embodiment, a Simulation Smoother was used to generate estimates for the raw speech samples. This Simulation Smoother included a Kalman filter stage and a smoothing filter stage in order to generate the estimates of the raw speech samples. In an alternative embodiment, the smoothing filter stage may be omitted, since the Kalman filter stage generates estimates of the raw speech (see equation (33)). However, these raw speech samples were ignored, since the speech samples generated by the smoothing filter are considered to be more accurate and robust. This is because the Kalman filter essentially generates a point estimate of the speech samples from the joint probability density function $p(\underline{s}(n)|\underline{a},k,\sigma_e^2)$, whereas the Simulation Smoother draws a sample from this probability density function.

In the above embodiment, a Simulation Smoother was used in order to generate estimates of the raw speech samples. It is possible to avoid having to estimate the raw speech samples by treating them as "nuisance parameters" and integrating them out of equation (19). However, this is not preferred, since the resulting integral will have a much more complex form than the Gaussian and Inverse Gamma mixture defined in equation (19). This in turn will result in more complex conditional probabilities corresponding to equations (20) to (30). In a similar way, the other nuisance parameters (such as the coefficient variances or any of the Inverse Gamma, alpha and beta parameters) may be integrated out as well. However, again this is not preferred, since it increases the complexity of the density function to be sampled using the Gibbs sampler. The technique of integrating out nuisance parameters is well known in the field of statistical analysis and will not be described further here.

In the above embodiment, the data analysis unit analysed the samples drawn by the Gibbs sampler by determining a histogram for each of the model parameters and then determining the value of the model parameter using a weighted average of the samples drawn by the Gibbs sampler with the weighting being dependent upon the number of samples in the corresponding bin. In an alterative embodiment, the value of the model parameter may be determined from the histogram as being the value of the model parameter having the highest count. Alternatively, a predetermined curve (such as a bell curve) could be fitted to the histogram in order to identify the maximum which best fits the histogram.

In the above embodiment, the statistical analysis unit modelled the underlying speech production process with a separate speech source model (AR filter) and a channel model. Whilst this is the preferred model structure, the underlying speech production process may be modelled without the channel model. In this case, there is no need to estimate the values of the raw speech samples using a Kalman filter or the like, although this can still be done. However, such a model of the underlying speech production process is not preferred, since the speech model will inevitably represent aspects of the channel as well as the speech. Further, although the statistical analysis unit described above ran a model order selection routine in order to allow the model orders of the AR filter model and the channel model to vary, this is not essential. In particular, the model order of the AR filter model and the channel model may be fixed in advance, although this is not preferred since it will inevitably introduce errors into the representation.

In the above embodiments, the speech that was processed was received from a user via a microphone. As those skilled in the art will appreciate, the speech may be received from a telephone line or may have been stored on a recording medium. In this case, the channel model will compensate for this so that the AR filter coefficients representative of the actual speech that has been spoken should not be significantly affected.

In the above embodiments, the speech generation process was modelled as an auto-regressive (AR) process and the channel was modelled as a moving average (MA) process. As those skilled in the art will appreciate, other signal models may be used. However, these models are preferred because it has been found that they suitably represent the speech source and the channel they are intended to model.

In the above embodiments, during the running of the model order selection routine, a new model order was proposed by drawing a random variable from a predetermined Laplacian distribution function. As those skilled in the art will appreciate, other techniques may be used. For example the new model order may be proposed in a deterministic way (i.e. under predetermined rules), provided that the model order space is sufficiently sampled.

The invention claimed is:

1. An apparatus for determining a quality measure indicative of the quality of a speech signal, the apparatus comprising:

a receiver operable to receive a set of speech signal values representative of a speech signal generated by a speech source as distorted by a transmission channel between the speech source and the receiver;

a memory operable to store a predetermined function which includes a first part having first parameters which models said source and a second part having second parameters which models said channel and which gives, for a given set of speech signal values, a probability density for parameters of a predetermined speech model which is assumed to have generated the set of speech signal values, the probability density defining, for a given set of model parameter values, the probability that the predetermined speech model has those parameter values, given that the model is assumed to have generated the set of speech signal values;

an applicator operable to apply the set of received speech signal values to said stored function to give the probability density for said model parameters for the set of received speech signal values;

a processor operable to process said function with said set of received speech signal values applied, to derive samples of at least said first parameters from said probability density;

an analyser operable to analyse at least some of said derived samples of said at least first parameters to determine a quality measure indicative of the quality of the received speech signal values; and an output operable to output values of said first parameters that are representative of said speech signal generated by said speech source before it was distorted by said transmission channel.

2. An apparatus according to claim 1, wherein said analyser is operable to determine a measure of the variance of said at least some of said derived samples of said at least first parameters to determine said quality measure.

3. An apparatus according to claim 2, wherein said probability density function is in terms of said variance measure and wherein said processor is operable to draw samples of said variance measure from said probability density function.

4. An apparatus according to claim 3, wherein said processor comprises a Gibbs sampler.

5. An apparatus according to claim 3, wherein said analyser is operable to determine a histogram of said drawn samples and wherein said quality measure is determined using said histogram.

6. An apparatus according to claim 5, wherein said analyser is operable to determine said quality measure using a weighted sum of said drawn samples, and wherein the weighting for each sample is determined from said histogram.

7. An apparatus according to claim 1, wherein said processor is operable to draw samples iteratively from said probability density function.

8. An apparatus according to claim 1, wherein said receiver is operable to receive a sequence of sets of speech signal values representative of an input speech signal and wherein said applicator, processor and analyser are operable to perform their respective functions with respect to each set of received speech signal values to determine a quality measure for each set of received signal values.

9. An apparatus according to claim 8, wherein said processor is operable to use the values of parameters obtained during the processing of a preceding set of signal values as initial estimates for the values of the corresponding parameters for a current set of signal values being processed.

10. An apparatus according to claim 8, wherein said sets of signal values in said sequence are non-overlapping.

11. An apparatus according to claim 1, wherein said speech model comprises an auto-regressive process model and wherein said parameters include auto-regressive model coefficients.

12. An apparatus according to claim 1, wherein said speech signal model includes a noise model having a noise parameter and wherein said quality measure is determined using said noise parameter.

13. An apparatus according to claim 1, wherein said processor is operable to determine a histogram of said derived samples and wherein said values of said first parameters are determined from said histogram.

14. An apparatus according to claim 13, wherein said processor is operable to determine said values of said first parameters using a weighted sum of said derived samples, and wherein the weighting for each sample is determined from said histogram.

15. An apparatus according to claim 1, wherein said processor is operable to derive samples of said second parameters and wherein said analyser is operable to determine said quality measure using the derived samples of said second parameters.

16. An apparatus according to claim 1, wherein said function is in terms of a set of raw speech signal values representative of speech generated by said source before being distorted by said transmission channel, wherein the apparatus further comprises a second processor operable to process the received set of signal values with initial estimates of said first and second parameters, to generate an estimate of the raw speech signal values corresponding to the received set of signal values and wherein said applicator is operable to apply said estimated set of raw speech signal values to said function in addition to said set of received signal values.

17. An apparatus according to claim 16, wherein said second processor comprises a simulation smoother.

18. An apparatus according to claim 16, wherein said second processor comprises a Kalman filter.

19. An apparatus according to claim 1, wherein said second part is a moving average model and said second parameters comprise moving average model coefficients.

20. An apparatus according to claim 1, further comprising a comparator responsive to said quality measure and operable to compare signals representative of the received speech signal with prestored models, to generate a comparison result.

21. An apparatus according to claim 20, wherein said signals representative of the speech signal are derived from said stored function.

22. An apparatus according to claim 1, further comprising an encoder operable to encode signals representative of the speech signal in dependence upon the output quality measure.

23. An apparatus for generating annotation data for use in annotating a data file, the apparatus comprising:

a receiver operable to receive a speech annotation;

an apparatus according to claim 1 for generating a quality measure indicative of the quality of the received speech annotation; and a generator operable to generate annotation data using data representative of the received speech annotation and said quality measure.

24. An apparatus according to claim 23, further comprising a speech recogniser operable to process the speech annotation to identify words and/or phonemes within the speech annotation, wherein said annotation data comprises data identifying said words and/or phonemes.

25. An apparatus according to claim 24, wherein said data representative of the received speech annotation is derived using said apparatus according to claim 1.

26. An apparatus according to claim 25, wherein said annotation data defines a phoneme and word lattice.

27. An apparatus for searching a database comprising a plurality of information entries to identify information to be retrieved therefrom, each of said plurality of information entries having an associated annotation and a quality measure indicative of the quality of the annotation;

a receiver operable to receive an input speech query;

an apparatus according to claim 1 for processing said input speech query to generate a quality measure therefor; and a comparator operable to compare data representative of the input speech query with said annotations in dependence upon the quality measure of said input speech query and the corresponding quality measures of said annotations.

28. An apparatus for searching a database comprising a plurality of annotations which include annotation data and a quality measure indicative of the quality of an annotation used to generate the annotation data, the apparatus comprising:

means for receiving an input audio query;

means for determining a quality measure for the input audio query; and means for comparing data representative of said input query with the annotation data of one or more of said annotations in dependence upon the quality measure for said input query and the corresponding quality measure for the annotation.

29. An apparatus according to claim 28, wherein said data representative of said input query and said annotation data comprise word and/or phoneme data.

30. An apparatus according to claim 28, wherein said comparing means is operable to compare said query data with said annotation data using a first comparison technique if both said quality measures exceed a predetermined threshold and is operable to compare said query data with said annotation data using a second comparison technique if either or both of said quality measures are below said predetermined threshold.

31. A method of determining a quality measure indicative of the quality of a speech signal, the method comprising the steps of:

receiving, at a receiver, a set of speech signal values representative of a speech signal generated by a speech source as distorted by a transmission channel between the speech source and the receiver;

storing a predetermined function which includes a first part having first parameters which models said source and a second part having second parameters which models said channel and which gives, for a given set of speech signal values, a probability density for parameters of a predetermined speech model which is assumed to have generated the set of speech signal values, the probability density defining, for a given set of model parameter values, the probability that the predetermined speech model has those parameter values, given that the model is assumed to have generated the set of speech signal values;

applying the set of received speech signal values to said stored function to give the probability density for said model parameters for the set of received speech signal values;

processing said function with said set of received speech signal values applied, to derive samples of at least said first parameters from said probability density;

analysing at least some of said derived samples of said at least first parameters to determine a quality measure indicative of the quality of the received speech signal values; and outputting values of said first parameters that are representative of said speech signal generated by said speech source before it was distorted by said transmission channel.

32. A method according to claim 31, wherein said analysing step determines a measure of the variance of said at least some of said derived samples of said at least first parameters in determining said quality measure.

33. A method according to claim 32, wherein said probability density function is in terms of said variance measure and wherein said processing step draws samples of said variance measure from said probability density function.

34. A method according to claim 33, wherein said processing step uses a Gibbs sampler.

35. A method according to claim 33, wherein said analysing step determines a histogram of said drawn samples and wherein said quality measure is determined using said histogram.

36. A method according to claim 35, wherein said analysing step determines said quality measure using a weighted sum of said drawn samples, and wherein the weighting for each sample is determined from said histogram.

37. A method according to claim 31, wherein said processing step draws samples iteratively from said probability density function.

38. A method according to claim 31, wherein said receiving step receives a sequence of sets of speech signal values representative of an input speech signal and wherein said applying step, processing step, and analysing step are performed with respect to each set of received speech signal values to determine a quality measure for each set of received signal values.

39. A method according to claim 38, wherein said processing step uses the values of parameters obtained during the processing of a preceding set of signal values as initial estimates for the values of the corresponding parameters for a current set of signal values being processed.

40. A method according to claim 38, wherein said sets of signal values in said sequence are non-overlapping.

41. A method according to claim 31, wherein said speech model comprises an auto-regressive process model and wherein said parameters include auto-regressive model coefficients.

42. A method according to claim 31, wherein said speech signal model includes a noise model having a noise parameter and wherein said quality measure is determined using said noise parameter.

43. A method according to claim 31, wherein said processing step determines a histogram of said derived samples and wherein said values of said first parameters are determined from said histogram.

44. A method according to claim 43, wherein said processing step determines said values of said first parameters using a weighted sum of said derived samples, and wherein the weighting for each sample is determined from said histogram.

45. A method according to claim 31, wherein said processing step derives samples of said second parameters and wherein said analysing step determines said quality measure using the derived samples of said second parameters.

46. A method according to claim 31, wherein said function is in terms of a set of raw speech signal values representative of speech generated by said source before being distorted by said transmission channel, wherein the method further comprises a second processing step of processing the received set of signal values with initial estimates of said first and second parameters, to generate an estimate of the raw speech signal values corresponding to the received set of signal values and wherein said applying step applies said estimated set of raw speech signal values to said function in addition to said set of received signal values.

47. A method according to claim 46, wherein said second processing step uses a simulation smoother.

48. A method according to claim 46, wherein said second processing step uses a Kalman filter.

49. A method according to claim 31, wherein said second part is a moving average model and said second parameters comprise moving average model coefficients.

50. A method according to claim 31, further comprising a step of comparing signals representative of the received speech signal with prestored models to generate a comparison result and wherein said comparing step is responsive to said quality measure.

51. A method according to claim 50, wherein said signals representative of the speech signal are derived from said stored function.

52. A method according to claim 31, further comprising a step of encoding signals representative of the speech signal in dependence upon the output quality measure.

53. A method of generating annotation data for use in annotating a data file, the method comprising the steps of:

receiving a speech annotation;

performing the method according to claim 31 to generate a quality measure indicative of the quality of the received speech annotation; and generating annotation data using data representative of the received speech annotation and said quality measure.

54. A method according to claim 53, further comprising a step of using a speech recognition unit to process the speech annotation to identify words and/or phonemes within the speech annotation, wherein said annotation data comprises said words and/or phonemes.

55. A method according to claim 54, wherein said data representative of the received speech annotation is derived using said method according to claim 31.

56. A method according to claim 55, wherein said annotation data defines a phoneme and word lattice.

57. A method of searching a database comprising a plurality of information entries to identify information to be retrieved therefrom, each of said plurality of information entries having an associated annotation and a quality measure indicative of the quality of the annotation, the method comprising the steps of:

receiving an input speech query;

using the method according to claim 31 to process said input speech query to generate a quality measure therefor; and comparing data representative of the input speech query with said annotations in dependence upon the quality measure of said input speech query and the corresponding quality measures of said annotations.

58. A computer readable medium storing computer executable process steps to cause a programmable computer apparatus to perform the method according to claim 31.

59. Processor implementable process steps for causing a programmable computing device to perform the method according to claim 31.

60. A method of searching a database comprising a plurality of annotations which include annotation data and a quality measure indicative of the quality of an annotation used to generate the annotation data, the method comprising the steps of:

receiving an input audio query;

determining a quality measure for the input audio query; and comparing data representative of said input query with the annotation data of one or more of said annotations in dependence upon the quality measure for said input query and the corresponding quality measure for the annotation.

61. A method according to claim 60, wherein said data representative of said input query and said annotation data comprise word and/or phoneme data.

62. A method according to claim 60, wherein said comparing step compares said query data with said annotation data using a first comparison technique if both said quality measures exceed a predetermined threshold and compares said query data with said annotation data using a second comparison technique if either or both of said quality measures are below said predetermined threshold.

63. An apparatus for determining a quality measure indicative of the quality of a speech signal, the apparatus comprising:

means for receiving a set of speech signal values representative of a speech signal generated by a speech source as distorted by a transmission channel between the speech source and the receiving means;

a memory for storing a predetermined function which includes a first part having first parameters which models said source and a second part having second parameters which models said channel and which gives, for a given set of speech signal values, a probability density for parameters of a predetermined speech model which is assumed to have generated the set of speech signal values, the probability density defining, for a given set of model parameter values, the probability that the predetermined speech model has those parameter values, given that the model is assumed to have generated the set of speech signal values;

means for applying the set of received speech signal values to said stored function to give the probability density for said model parameters for the set of received speech signal values;

means for processing said function with said set of received speech signal values applied, to derive samples of at least said first parameters from said probability density;

means for analysing at least some of said derived samples of said at least first parameters to determine a quality measure indicative of the quality of the received speech signal values; and means for outputting values of said first parameters that are representative of said speech signal generated by said speech source before it was distorted by said transmission channel.

64. An apparatus for generating annotation data for use in annotating a data file, the apparatus comprising:

means for receiving a speech annotation;

an apparatus according to claim 63 for generating a quality measure indicative of the quality of the received speech annotation; and means for generating annotation data using data representative of the received speech annotation and said quality measure.

65. An apparatus for searching a database comprising a plurality of information entries to identify information to be retrieved therefrom, each of said plurality of information entries having an associated annotation and a quality measure indicative of the quality of the annotation;

means for receiving an input speech query;

an apparatus according to claim 63 for processing said input speech query to generate a quality measure therefor; and means for comparing data representative of the input speech query with said annotations in dependence upon the quality measure of said input speech query and the corresponding quality measures of said annotations.

* * * * *

UNITED STATES PATENT AND TRADEMARK OFFICE

CERTIFICATE OF CORRECTION

PATENT NO. : 7,010,483 B2
APPLICATION NO. : 09/866854
DATED : March 7, 2006
INVENTOR(S) : Jebu Jacob Rajan It is certified that error appears in the above-identified patent and that said Letters Patent is hereby corrected as shown below:

ON TITLE PAGE, ITEM (56) OTHER PUBLICATIONS

After "Quatieri et al.,": "Proceeed-" should read --Proceed--; and
Page 2, After, "Query expansion": "Appliations" should read --Applications--.

ON TITLE PAGE, ITEM (56) U.S. PATENT DOCUMENTS

Page 2, "Vähätalo" should read --Vähätalo et al.--; and
Page 2, After "Bayesian Separation": "Autoregssive" should read --Autoregressive--.

COLUMN 1

Line 14, "example," should read --for example,--.

COLUMN 4

Line 8, "with out of" should read --without--.

COLUMN 5

Line 51, "step sill" should read --step s111--; and
Line 56, "step sill" should read --step s111--.

COLUMN 7

Line 58, "$s(n) = a_1 s(n-1) + a_2 s(n-2) + \ldots + a_k s)(n-k) + e(n)$ $$s(n-1) = a_1 s(n-2) + a_2 s(n-3) + \ldots + a_k s(n-k-1) + e(n-1)$$

$$s(n-N+1) = a_1 s(n-N) + a_2 s(n-N-1) + \ldots + a_k s(n-k-N+1) + e(n-N+1) \quad (3)"$$

should read

-- "$s(n) = a_1 s(n-1) + a_2 s(n-2) + \ldots + a_k s(n-k) + e(n)$ $$s(n-1) = a_1 s(n-2) + a_w s(n-3) + \ldots + a_k s(n-k-1) + e(n-1)$$

$$\ddots$$

$$s(n-N+1) = a_1 s(n-N) + a_2 s(n-N-1) + \ldots + a_k s(n-k-N+1) + e(n-N+1)$$

(3) --.

UNITED STATES PATENT AND TRADEMARK OFFICE
CERTIFICATE OF CORRECTION

PATENT NO. : 7,010,483 B2 
APPLICATION NO. : 09/866854
DATED : March 7, 2006
INVENTOR(S) : Jebu Jacob Rajan It is certified that error appears in the above-identified patent and that said Letters Patent is hereby corrected as shown below:

COLUMN 8

Lines 29-34, "$e(n) = s(n) - a_1 s(n-1) - a_2 s(n-2) - \cdots - a_k s(n-k)$ $$e(n-1) = s(n-1) - a_1 s(n-2) - a_2 s(n-3) - \cdots - a_k s(n-k-1)$$

$$e(n-N+1) = s(n-N+1) = a_1 s(n-N) - a_2 s(n-N-1) - \cdots - a_k s(n-k-N+1) \quad (5)$$"

should read

--$e(n) = s(n) - a_1 s(n-1) - a_2 s(n-2) - \cdots - a_k s(n-k)$ $$e(n-1) = s(n-1) - a_1 s(n-2) - a_2 s(n-3) - \cdots - a_k s(n-k-1)$$

$$\ddots$$

(5)--; and $$e(n-N+1) = s(n-N+1) = a_1 s(n-N) - a_2 s(n-N-1) - \cdots - a_k s(n-k-N+1)$$

Lines 57-62, "$g(n) = h_1 s(n-1) + h_2 s(n-2) + \ldots + h_r s(n-r) + \epsilon(n)$ $$g(n-1) = h_1 s(n-2) + h_2 s(n-3) + \ldots + h_r s(n-r-1) + \epsilon(n-1)$$

$$q(n-N+1) = h_1 s(n-N) + h_2 s(n-N-1) + \ldots + h_r s(n-r-N+1) + \epsilon(n-N+1) \quad (7)$$"

UNITED STATES PATENT AND TRADEMARK OFFICE
CERTIFICATE OF CORRECTION

PATENT NO. : 7,010,483 B2
APPLICATION NO. : 09/866854
DATED : March 7, 2006
INVENTOR(S) : Jebu Jacob Rajan It is certified that error appears in the above-identified patent and that said Letters Patent is hereby corrected as shown below:

should read

--$g(n) = h_1 s(n-1) + h_2 s(n-2) + \ldots + h_r s(n-r) + \epsilon(n)$ $g(n-1) = h_1 s(n-2) + h_2 s(n-3) + \ldots + h_r s(n-r-1) + \epsilon(n-1)$ $\ddots$ $q(n-N+1) = h_1 s(n-N) + h_2 s(n-N-1) + \ldots + h_r s(n-r-N+1) + \epsilon(n-N+1)$ (7) --.

COLUMN 9

Lines. 47-49, " $\frac{p(\underline{y}(n)|\underline{s}(n),\underline{h},r,\sigma_\epsilon^2)p(\underline{s}(n)|\underline{a},k,\sigma_e^2)p(\underline{a}|k)p(\underline{h}|r)p(\sigma_\epsilon^2)p(\sigma_e^2)p(k)p(r)}{p(\underline{y}(n))}$ "

should read -- $\frac{p(\underline{y}(n)|\underline{s}(n),\underline{h},r,\sigma_\epsilon^2)p(\underline{s}(n)|\underline{a},k,\sigma_e^2)p(\underline{a}|k)p(\underline{h}|r)p(\sigma_\epsilon^2)p(\sigma_e^2)p(k)p(r)}{p(\underline{y}(n))}$ --.

COLUMN 10

Line 5, " $p(\underline{s}(n)|\underline{a},k,\sigma_e^2) = p(\underline{e}(n))\left|\frac{\delta\underline{e}(n)}{\delta\underline{s}(n)}\right|_{\underline{e}(n)=\underline{s}(n)-S\underline{a}}$ (11) " should read -- $p(\underline{s}(n)|\underline{a},k,\sigma_e^2) = p(\underline{e}(n))\left|\frac{\delta\underline{e}(n)}{\delta\underline{s}(n)}\right|_{\underline{e}(n)} = \underline{s}(n) - S\underline{a}$ (11) --; and Line 55, " $p(\underline{y}(n)|\underline{s}(n),\underline{h},r,\sigma_\epsilon^2) = p(\underline{\varepsilon}(n))\left|\frac{\delta\underline{\varepsilon}(n)}{\delta\underline{y}(n)}\right|_{\underline{\varepsilon}(n)=\underline{q}(n)-Y\underline{h}}$ (14) " should read -- $p(\underline{y}(n)|\underline{s}(n),\underline{h},r,\sigma_\varepsilon^2) = p(\underline{\varepsilon}(n))\left|\frac{\delta\underline{\varepsilon}(n)}{\delta\underline{y}(n)}\right|_{\underline{\varepsilon}(n)} = \underline{q}(n) - Y\underline{h}$ (14) --.

UNITED STATES PATENT AND TRADEMARK OFFICE

CERTIFICATE OF CORRECTION

PATENT NO. : 7,010,483 B2 
APPLICATION NO. : 09/866854
DATED : March 7, 2006
INVENTOR(S) : Jebu Jacob Rajan It is certified that error appears in the above-identified patent and that said Letters Patent is hereby corrected as shown below:

COLUMN 13

Lines 38-44, "

$$p(\underline{a},k|\underline{h}^0,r^0,\sigma_e^{2^0},\sigma_\varepsilon^{2^0},\sigma_h^{2^1},)(\underline{s}(n))^0,\underline{y}(n)) \rightarrow \underline{a}^1,k^1$$
$$p(\underline{h},r|\underline{a}^1,k^1,\sigma_e^{2^0},\sigma_\varepsilon^{2^0},\sigma_a^{2^0},\sigma_h^{2^0},\underline{s}(n)^0,\underline{y}(n)) \rightarrow \underline{h}^1,k^1$$
$$p(\sigma_e^2|\underline{\alpha}^1,k^1,h^1,r^1,\sigma_\varepsilon^{2^0},\sigma_a^{2^0},\sigma_h^{2^1},\underline{s}(n)^0,\underline{y}(n)) \rightarrow \underline{\sigma}_e^{2^1}$$
$$\vdots$$
$$p(\sigma_h^{2^1}|\underline{\alpha}^1,k^1,h^1,r^1,\sigma_\varepsilon^{2^1},\sigma_a^{2^1},\sigma_h^{2^1},\underline{s}(n))^0,\underline{y}(n)) \rightarrow \underline{\sigma}_h^{2^1}$$

" should read

--

$$p(\underline{a},k|\underline{h}^0,r^0,\sigma_e^{2^0},\sigma_\varepsilon^{2^0},\sigma_a^{2^0},\sigma_h^{2^0},)(\underline{s}(n))^0,\underline{y}(n)) \rightarrow \underline{a}^1,k^1$$
$$p(\underline{h},r|\underline{a}^1,k^1,\sigma_e^{2^0},\sigma_\varepsilon^{2^0},\sigma_a^{2^0},\sigma_h^{2^0},\underline{s}(n)^0,\underline{y}(n)) \rightarrow \underline{h}^1,k^1$$
$$p(\sigma_e^2|\underline{\alpha}^1,k^1,h^1,r^1,\sigma_\varepsilon^{2^0},\sigma_a^{2^0},\sigma_h^{2^1},\underline{s}(n)^0,\underline{y}(n)) \rightarrow \underline{\sigma}_e^{2^1}$$
$$\vdots$$
$$p(\sigma_h^{2^1}|\underline{\alpha}^1,k^1,h^1,r^1,\sigma_\varepsilon^{2^1},\sigma_a^{2^1},\sigma_h^{2^1},\underline{s}(n))^0,\underline{y}(n)) \rightarrow \underline{\sigma}_h^{2^1}$$

--.

COLUMN 17

Line 20, "*a* vector." should read -- $\underline{a}$ vector.--.

COLUMN 18

Line 4, " $\hat{\underline{S}}(n) = \overline{A}.\hat{\underline{s}}(n-1) + \hat{\underline{e}}(n)$ " should read -- $\hat{\underline{s}}(n) = \overline{A}.\hat{\underline{s}}(n-1) + \hat{\underline{e}}(n)$ --.

COLUMN 19

Line 37, " $\tilde{e}(t) = \sigma_e^2 \underline{r}(t) + \underline{\theta}(t)$ where $\tilde{e}(t) = [\tilde{e}(t)\tilde{e}(t-1)\tilde{e}(t-2)\ldots\tilde{e}(t-r+1)]^T$ " should read -- $\tilde{e}(t) = \sigma_e^2 \underline{r}(t) + \underline{\eta}(t)$ where $\tilde{e}(t) = [\tilde{e}(t)\tilde{e}(t-1)\tilde{e}(t-2)\ldots\tilde{e}(t-r+1)]^T$ --.

UNITED STATES PATENT AND TRADEMARK OFFICE

CERTIFICATE OF CORRECTION

PATENT NO. : 7,010,483 B2
APPLICATION NO. : 09/866854
DATED : March 7, 2006
INVENTOR(S) : Jebu Jacob Rajan It is certified that error appears in the above-identified patent and that said Letters Patent is hereby corrected as shown below:

COLUMN 20

Line 14, “above described” should read --above-described--;
Line 44, “above” should read --above- --; and
Line 53, “above described” should read --above-described--.

COLUMN 22

Line 25, “value which was” should read --values which were--.

COLUMN 29

Line 20, “comprising” should read --comprising: ¶--.

Signed and Sealed this

Thirteenth Day of February, 2007

JON W. DUDAS
*Director of the United States Patent and Trademark Office*